US008743380B2

(12) United States Patent
Okada

(10) Patent No.: US 8,743,380 B2
(45) Date of Patent: Jun. 3, 2014

(54) INFORMATION PROCESSING APPARATUS, PRINTING APPARATUS, PRINTING SYSTEM, CONTROL PROGRAM, PRINTING MEDIUM, AND PRINTING MEDIUM SELECTION CONTROL METHOD

(75) Inventor: Hideyuki Okada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1250 days.

(21) Appl. No.: 11/552,626

(22) Filed: Oct. 25, 2006

(65) Prior Publication Data
US 2007/0097437 A1    May 3, 2007

(30) Foreign Application Priority Data

Nov. 1, 2005   (JP) ................................. 2005-318740

(51) Int. Cl.
G06K 15/00      (2006.01)
(52) U.S. Cl.
USPC ........ 358/1.12; 358/1.13; 358/1.15; 358/1.18
(58) Field of Classification Search
USPC ............. 358/1.12, 1.18, 1.15, 504, 1.13, 296, 358/300, 402, 407, 440; 719/310
See application file for complete search history.

(56) References Cited

U.S. PATENT DOCUMENTS

| | | | | | |
|---|---|---|---|---|---|
| 5,644,685 | A | * | 7/1997 | Baehr | 358/1.12 |
| 5,764,368 | A | * | 6/1998 | Shibaki et al. | 358/296 |
| 5,835,820 | A | * | 11/1998 | Martin et al. | 399/85 |
| 6,762,856 | B2 | * | 7/2004 | Farrell et al. | 358/1.8 |
| 6,965,404 | B2 | * | 11/2005 | Hosoda et al. | 348/231.6 |
| 7,102,774 | B2 | * | 9/2006 | White | 358/1.15 |
| 7,649,642 | B2 | * | 1/2010 | Bos et al. | 358/1.15 |
| 7,847,969 | B2 | * | 12/2010 | Iwanaga et al. | 358/1.18 |
| 2001/0022662 | A1 | * | 9/2001 | Hosoda | 358/1.9 |
| 2002/0021902 | A1 | * | 2/2002 | Hosoda et al. | 396/429 |
| 2003/0025936 | A1 | * | 2/2003 | Ouchi et al. | 358/1.15 |
| 2003/0067618 | A1 | * | 4/2003 | Farrell et al. | 358/1.12 |
| 2003/0072030 | A1 | * | 4/2003 | Haines et al. | 358/1.15 |
| 2004/0042032 | A1 | * | 3/2004 | Laughlin | 358/1.15 |
| 2004/0212834 | A1 | * | 10/2004 | Edwards et al. | 358/1.18 |
| 2004/0218209 | A1 | * | 11/2004 | Hamaguchi et al. | 358/1.15 |
| 2005/0201771 | A1 | * | 9/2005 | Mizuno | 399/88 |
| 2006/0026600 | A1 | * | 2/2006 | Yoshida | 719/310 |
| 2006/0119874 | A1 | * | 6/2006 | Kurihara | 358/1.13 |
| 2006/0170991 | A1 | * | 8/2006 | Jacob et al. | 358/504 |

FOREIGN PATENT DOCUMENTS

JP      2005-165722 A     6/2005

* cited by examiner

*Primary Examiner* — Allen H Nguyen
(74) *Attorney, Agent, or Firm* — Rossi, Kimms & McDowell LLP

(57) ABSTRACT

An object of this invention is to reduce the burden of setting work when setting the correspondence between printing media and paper feed stages in a printing apparatus which selects a predetermined printing medium and prints image data. To achieve this object, according to this invention, an information processing method in a printing apparatus capable of selecting a desired printing medium as a printing condition in selecting a printing medium set on the paper feed stage and printing includes the display step of displaying a medium setting template, the step of selecting an arbitrary template name from the template names of the displayed medium setting template, and the step of setting the correspondence between the set medium contents and the paper feed tray in correspondence with the selected template name. A printing process is performed on the set medium for each paper feed tray.

10 Claims, 30 Drawing Sheets

F I G. 3
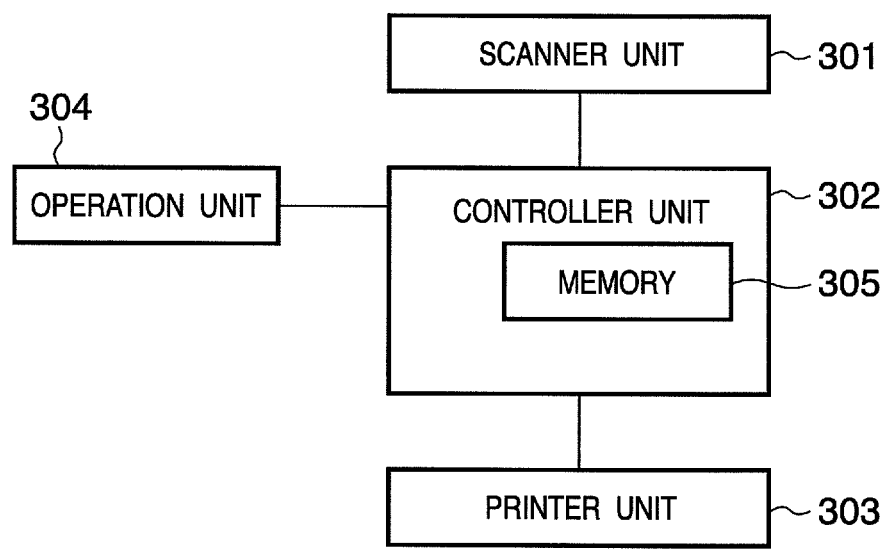

| TEMPLATE NAME (IDENTIFIER) | SET MEDIUM NAME (OPTION) |
|---|---|
| ○○○ COMPANY | HAMMERMILL BOND |
| | GA BOARD |
| | NB RECYCLE |
| | GINGHAM GA |
| | KENAF KENT |
| △△△ COMPANY | NB RECYCLE |
| | AB RECYCLE 20 |
| | KENAF KENT |
| | CC CARDBOARD |
| USER A | HAMMERMILL BOND |
| | GA BOARD |
| | OHP CLEAR |
| MEDIA ON 12/06 | JAPANESE PAPER 44 |
| LOW-COST PAPER SET | BEST-COST PAPER |
| | REASONABLE PAPER |
| | NB RECYCLE |
| BOOKBINDING SET | KENAF KENT |
| | BOOKBINDING PAPER BI |
| | COP PLAIN PAPER |
| · | · |
| · | · |
| N | M |

| MEDIUM NAME | THICKNESS | COLOR | FIXING VOLTAGE |
|---|---|---|---|
| AB RECYCLE 20 | 21 | WHITE | · |
| CC CARDBOARD | 40 | LIGHT YELLOW | · |
| COP PLAIN PAPER | 20 | WHITE | · |
| GA BOARD | 18 | LIGHT BLUE | · |
| NB RECYCLE | 20 | WHITE | · |
| OHP CLEAR | 32 | TRANSPARENT | · |
| GINGHAM GA | 20 | WHITE | · |
| KENAF KENT | 20 | WHITE | · |
| HAMMERMILL BOND | 22 | WHITE | · |
| BEST-COST PAPER | 21 | LIGHT YELLOW | · |
| REASONABLE PAPER | 23 | LIGHT YELLOW | · |
| BOOKBINDING PAPER BI | 31 | WHITE | · |
| JAPANESE PAPER 44 | 38 | LIGHT BROWN | · |
| · | · | · | · |
| · | · | · | · |
| N | N | N | N |

INFORMATION PROCESSING APPARATUS, PRINTING APPARATUS, PRINTING SYSTEM, CONTROL PROGRAM, PRINTING MEDIUM, AND PRINTING MEDIUM SELECTION CONTROL METHOD

BACKGROUND OF THE INVENTION

1. Field of the Invention

The present invention relates to a process of selecting a printing medium when selecting a predetermined printing medium and printing image data.

2. Description of the Related Art

Conventionally in the commercial printing industry, a publication is issued through various work steps. Examples of the work steps are entry of a document, designing of the document, layout editing, comprehensive layout (presentation by printing), proofreading (layout correction and color correction), proof (proof print), block copy preparation, printing, post-process, and shipping.

In particular, the commercial printing industry often uses an offset reproduction printing press in the printing step, and the block copy preparation step is indispensable. However, once the block copy is prepared, it is difficult and disadvantageous in terms of cost to correct the block copy. In block copy preparation, therefore, careful proofreading (i.e., careful layout check and color confirmation) is indispensable. Some period of time is generally necessary until issuing of a publication is completed.

In the commercial printing industry, most of apparatuses used in respective work steps are bulky and expensive. In addition, work in each step requires expert knowledge, which is indispensable.

With the advent of high-speed and high-quality printing apparatuses of other types, a so-called print-on-demand (to be referred to as POD hereinafter) market is coming into competition against the commercial printing industry. Printing apparatuses of other types are, for example, an electrophotographic printing apparatus and inkjet printing apparatus.

The POD market appears to replace large-scale printing presses and printing methods so as to deal with jobs of relatively small lots within a short period without using any bulky apparatus or system.

In the POD market, digital printing using electronic data can be implemented to provide printing services and the like by making the best of printing apparatuses such as a digital copying machine and digital multifunction peripheral.

In the POD market, digitization which has advanced more than in the conventional commercial printing industry, management and control using computers become widespread, and a printed material can be actually issued within a short period. As another advantage, the POD market does not require any know-how of the operator. Recently, the quality of printed materials by POD printing is coming close to the level of the commercial printing industry.

In this situation, digital copying machines and digital multifunction peripherals in the POD market have been examined (see Japanese Patent Laid-Open No. 2005-165722).

It is preferable that printing apparatuses suited to even the POD market flexibly cope with various printing media with different attributes.

For example, on site in the POD environment, customers requesting printing may require printing using various types of printing media. A conventional printing apparatus only designates a printing medium by rough classification such as plain paper, cardboard, tab paper, or OHP sheet for settings in printing. It is desirable to construct a printing environment capable of flexibly handling various printing media with different attributes so as to cope with even the POD environment. Such a printing environment allows setting a printing medium in the printing apparatus by fine classification such as "a specific printing medium available from a specific company". It is desired to flexibly meet needs for various printing media from various users (customers) requesting printing on the assumption of even the POD environment.

It is also desirable to fully deal with the following situation.

There is demand to minimize problems: for example, the burden on the operator working on site upon reception of a printing request from a customer increases in order to flexibly meet needs for various printing media from various users (customers) requesting printing, as described above. Concerns are rising about the burden on the operator in charge of printing work upon reception of a printing order from a customer in order to treat an enormous number of printing media which may possibly be used by customers. To solve this problem, it is desirably prevented to request a cumbersome operation of the operator when selecting a printing medium which complies with a demand from a customer for printing. The cumbersome operation is, for example, to find out information on a printing medium for use from information on an enormous number of printing media prepared on site, and make appropriate print settings.

As described above, it is desirable to prepare a printing environment which minimizes an increase in burden on the operator working on site, while sufficiently satisfying potential needs in the POD environment.

SUMMARY OF THE INVENTION

The present invention has been made to overcome the conventional drawbacks, and has as its object to provide a mechanism capable of reducing the burden on an operator and flexibly meeting various needs from various customers as much as possible on the assumption of various situations and use environments.

To achieve the above object, a printing medium selection control method according to the present invention comprises the following steps.

That is, a printing medium selection control method comprising the steps of:

causing a user interface unit to present a plurality of printing medium options associated with one identifier among a plurality of identifiers associated with printing medium options selectable by a printing apparatus so as to discriminate the plurality of printing medium options associated with the one identifier from printing medium options associated with other identifiers; and causing the printing apparatus to select a printing medium corresponding to an option selected by a user among the plurality of options presented by the user interface unit.

The present invention can solve problems assumed in the prior art. For example, the present invention can prepare a printing environment capable of flexibly handling various printing media with different attributes so as to cope with even the POD environment. The present invention can also prepare a printing environment capable of minimizing an increase in burden on an operator working on site, while fully satisfying potential needs in the POD environment. The present invention can, therefore, provide a mechanism capable of flexibly meeting various needs from various customers as much as possible on the assumption of various situations and use environments.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram showing the functional arrangement of a digital multifunction peripheral 102 according to the first embodiment of the present invention;

FIG. 27 is a table showing an example of the data contents of the medium setting template;

FIG. 28 is a table showing an example of a printing medium table associated with the medium setting template;

DESCRIPTION OF THE EMBODIMENTS

Preferred embodiments of the present invention will now be described in detail in accordance with the accompanying drawings.

First Embodiment

<Configuration of Printing System>

Figure 1:
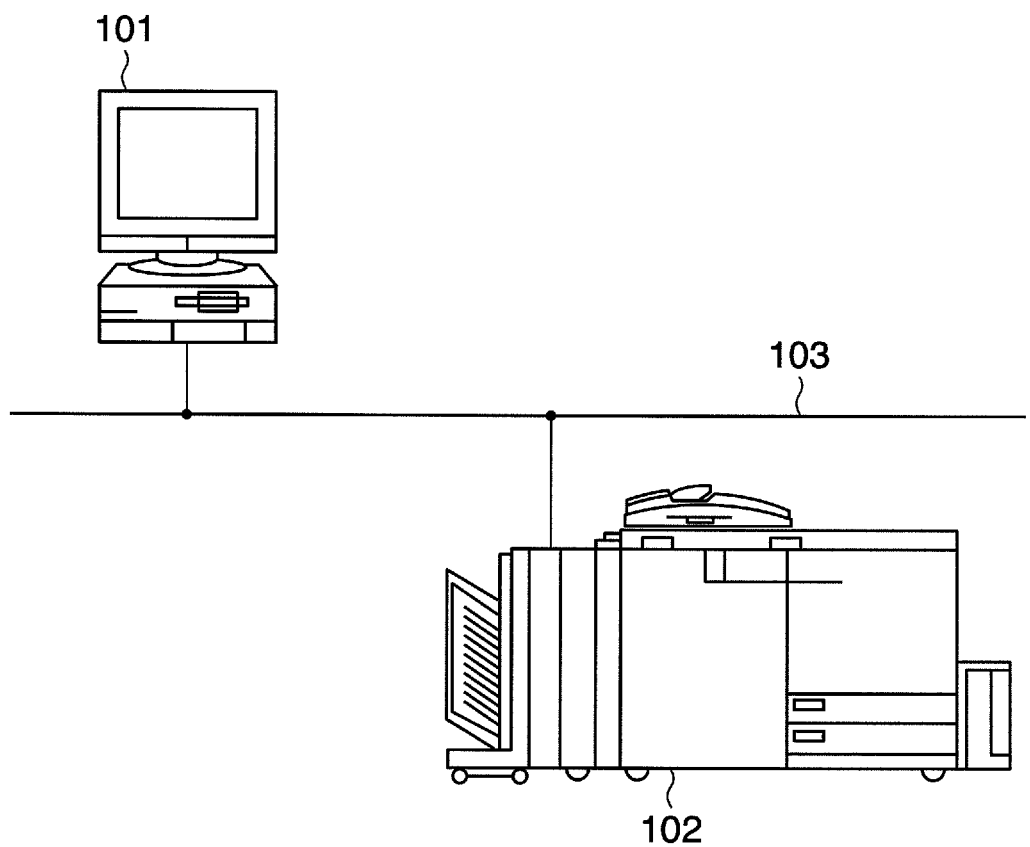
FIG. 1 is a view showing an example of a network system having a digital multifunction peripheral (printing apparatus) according to the first embodiment of the present invention.
Figure 2:
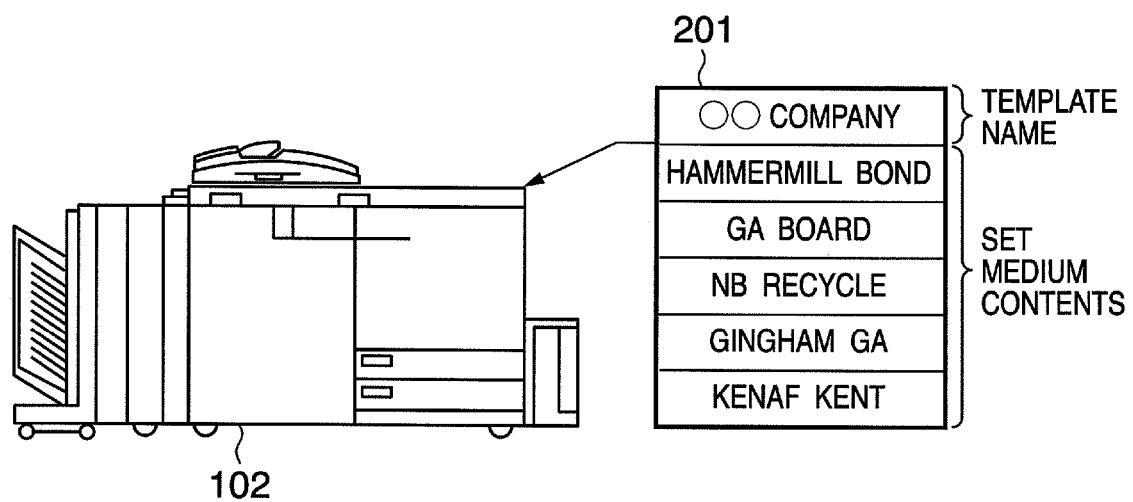
FIG. 2 is a view showing an example of a medium setting template.

FIG. 1 is a view showing an example of a network system having a digital multifunction peripheral (printing apparatus) according to the first embodiment of the present invention. In FIG. 1, a client PC 101 and digital multifunction peripheral 102 communicably connect to each other via a network 103. As shown in FIG. 2, the digital multifunction peripheral 102 comprises a storage unit (memory 305) which stores a medium setting template 201. A controller unit 302 of the digital multifunction peripheral 102 manages the medium setting template 201. The controller unit 302 stores a plurality of printing medium options selectable by the printing apparatus and identifiers in association with each other as data of the medium setting template 201. The controller unit 302 manages a plurality of options corresponding to identifiers, and displays options associated with the respective identifiers on a display device 706. In FIG. 2, an example of the option is information representing a printing medium attribute "set medium name". An example of the identifier is information "template name". The user can register an identifier and option via a user interface unit such as an operation unit 304 of the digital multifunction peripheral 102, an input device 705 of the client PC 101, or the display device 706. Upon reception of an instruction to register an identifier and option via the user interface unit, the controller unit 302 registers the identifier and option and their association in the medium setting template 201 of the memory 305 in accordance with the instruction.

In FIG. 2, the medium setting template 201 holds one identifier and five options associated with it. In the first embodiment, the controller unit 302 controls the medium setting template 201 to register a plurality of identifiers and a plurality of options. An example of data (data contents) in the medium setting template 201 will be explained with reference to FIG. 27.

For example, the controller unit 302 associates data of a template name (identifier) 2701 with that of a set medium name (option) 2702, and stores them as data of the medium setting template 201 in the memory 305.

In the example of FIG. 27, the controller unit 302 stores, in the memory 305, six identifiers which are registered in advance by a user as unique names "OOO company, "ΔΔΔ company", "user A", "media on 12/06", "low-cost paper set", and "bookbinding set". The controller unit 302 stores five options of set medium names "Hammermill bond", "GA board", "NB recycle", "gingham GA", and "kenaf Kent" in association with one identifier "OOO company". Similarly, the controller unit 302 registers four options "NB recycle", "AB recycle 20", "kenaf Kent", and "CC cardboard" in association with one identifier "ΔΔΔ company". The controller unit 302 registers three options "Hammermill bond", "GA board", and "OHP clear" in association with one identifier "user A". The controller unit 302 stores one option "Japanese paper 44" in association with one identifier "media on 12/06". The controller unit 302 registers three options "best-cost paper", "reasonable paper", and "NB recycle" in association with one identifier "low-cost paper set". The controller unit 302 stores three options "kenaf Kent", "bookbinding paper BI", and "COP plain paper" in association with one identifier "bookbinding set".

In the first embodiment, the controller unit 302 controls to register a plurality of identifiers as data of the medium setting template 201 in the memory 305. Further, the controller unit 302 controls to register, in the memory 305, options selectable by the digital multifunction peripheral 102 for each identifier. The controller unit 302 also controls to register a plurality of options in association with one identifier. The controller unit 302 controls to register one option in association with one identifier.

As shown in FIG. 27, an option is not always unique, and may be associated with a plurality of identifiers. Such an option may be saved in a table having a parameter such as an attribute corresponding to the option, and associated with the table.

In this manner, the digital multifunction peripheral 102 according to the first embodiment has a plurality of printing medium options. The controller unit 302 of the digital multifunction peripheral 102 according to the first embodiment controls a printing process on a printing medium selected from a plurality of printing medium options. Each printing medium has attributes which are different between printing media and are used for a printing process. The attributes are, e.g., the thickness, color, and fixing voltage of the printing medium. To print in correspondence with these attributes, the controller unit 302 stores, holds, and manages a printing medium table as shown in FIG. 28 in the memory 305.

The printing medium table records various attributes unique to each printing medium, and attribute-specific parameters used for printing. The controller unit 302 uses the printing medium table in printing. If necessary, the medium setting template 201 and the printing medium table in FIG. 28 are readable in a printing process corresponding to an operation from the user interface unit of the client PC 101 or digital multifunction peripheral 102. The printing medium table is associated with printing medium options using information based on the medium setting template 201 so as to be able to use printing medium attribute information in selecting an option on the basis of the medium setting template 201. In printing, the controller unit 302 searches the printing medium table held in the memory 305 to execute a printing process using the thickness, color, fixing voltage, and another information corresponding to a selected printing medium.

These arrangements are not limited to the first embodiment, and are also used in the second and other embodiments.

<Functional Arrangement of Digital Multifunction Peripheral>

The functional arrangement of the digital multifunction peripheral 102 according to the first embodiment of the present invention will be described with reference to FIG. 3.

FIG. 3 is a block diagram showing the functional arrangement of the digital multifunction peripheral 102. FIG. 3 is a block diagram illustrating particularly a digital multifunction peripheral having functions such as COPY, PRINT, and FAX.

In FIG. 3, reference numeral 301 denotes a scanner unit which scans a document. The controller unit 302 processes an image scanned by the scanner unit 301 and stores the image data in the memory 305. The operation unit 304 allows setting various printing conditions and the like for an image scanned by the scanner unit 301. Reference numeral 303 denotes a printer unit which forms an image on a printing medium under printing conditions set via the operation unit 304 on the basis of image data read out from the memory 305.

<Detailed Arrangement of Controller Unit 302>

Details of the hardware arrangement of the controller unit 302 which controls the digital multifunction peripheral 102 will be described with reference to FIG. 4.

Figure 4:
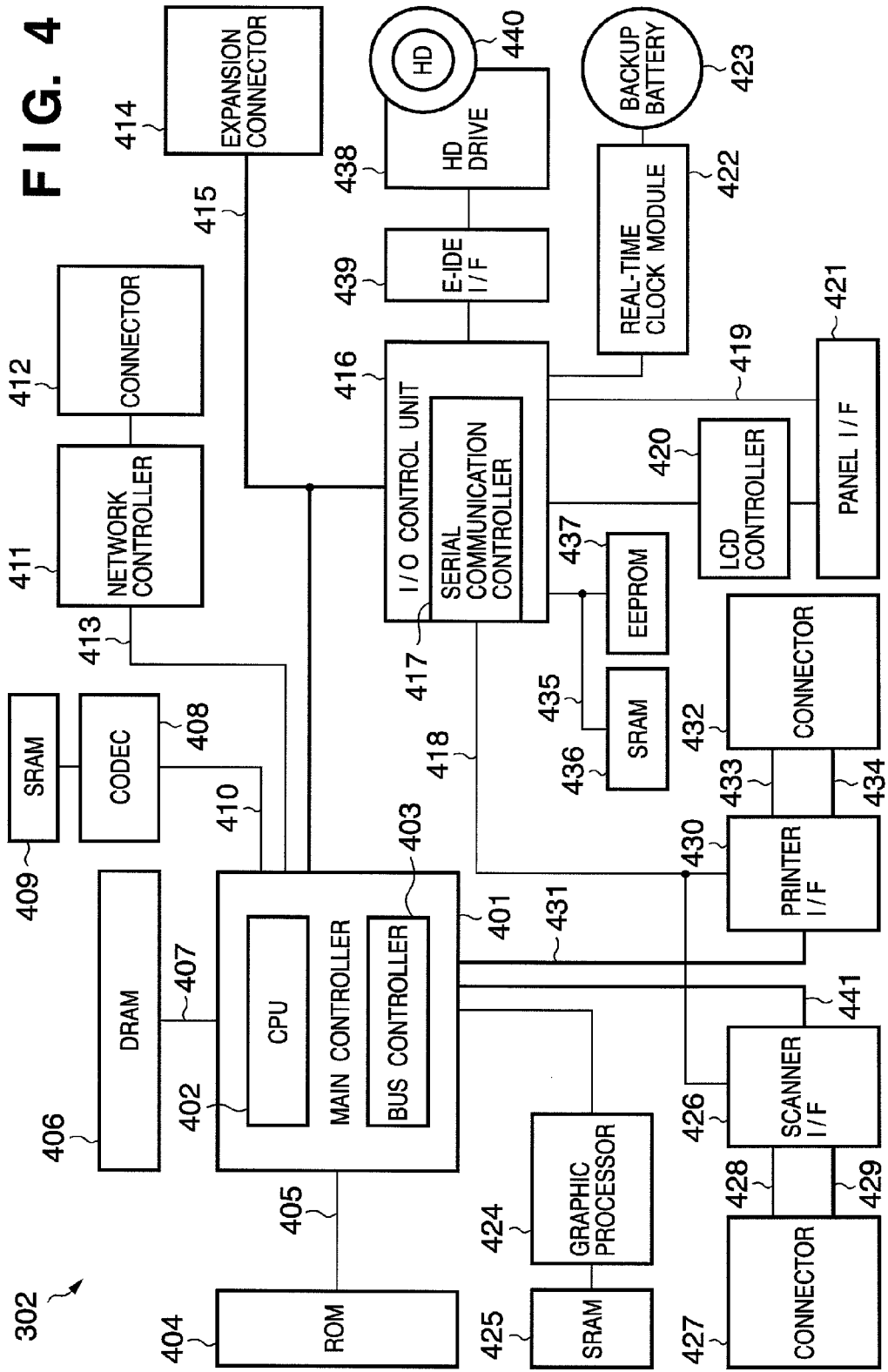
FIG. 4 is a block diagram showing details of the hardware arrangement of a controller unit 302 which controls the digital multifunction peripheral 102.

As shown in FIG. 4, a main controller 401 in the controller unit 302 mainly comprises a CPU 402, a bus controller 403, and various I/F controller circuits.

The CPU 402 and bus controller 403 control the whole operation of the digital multifunction peripheral 102. The CPU 402 runs on the basis of a program loaded from a ROM 404 via a ROM I/F 405 in booting. This program also describes an operation to interpret received PDL (Page Description Language) code data and expand it into raster image data. Software performs the above operation. The bus controller 403 controls transfer of data input/output from/to each I/F, and performs arbitration upon bus contention and control of DMA data transfer.

A DRAM 406 connects to the main controller 401 via a DRAM I/F 407. The DRAM 406 functions as a work area for operating the CPU 402 and an area for accumulating image data.

A Codec 408 compresses raster image data accumulated in the DRAM 406 by a format such as MH/MR/MMR/JBIG/JPEG, and decompresses compressed/accumulated code data into raster image data. An SRAM 409 serves as a temporary work area for the Codec 408. The Codec 408 connects to the main controller 401 via an I/F 410. The bus controller 403 controls data transfer between the Codec 408 and the DRAM 406 to DMA-transfer the data.

A graphic processor 424 performs processes such as image rotation, scaling, color space conversion for raster image data accumulated in the DRAM 406. An SRAM 425 functions as a temporary work area for the graphic processor 424. The graphic processor 424 connects to the main controller 401 via an I/F. The bus controller 403 controls data transfer between the graphic processor 424 and the DRAM 406 to DMA-transfer the data.

A network controller 411 connects to the main controller 401 via an I/F 413, and to an external network via a connector 412. The network is generally Ethernet®.

A general high-speed bus 415 connects an I/O control unit 416 and an expansion connector 414 for connecting an expansion board. The general high-speed bus is generally a PCI bus. The I/O control unit 416 comprises asynchronous serial communication controllers 417 of two channels that transmit/receive control commands to/from the CPUs of the scanner unit 301 and printer unit 303. The I/O control unit 416 connects to a scanner I/F circuit 426 and printer I/F circuit 430 via an I/O bus 418.

A panel I/F 421 connects to an LCD controller 420, and comprises an I/F for display on the liquid crystal screen of the operation unit 304, and a key input I/F for input from hard keys and touch panel keys.

The operation unit 304 comprises a liquid crystal display, a touch panel input device adhered on the liquid crystal display, and a plurality of hard keys. The CPU 402 receives, via the panel I/F 421, a signal input from the touch panel or hard keys. The liquid crystal display displays image data sent from the panel I/F 421. The liquid crystal display displays functions and image data in an operation in the digital multifunction peripheral 102.

A real-time clock module 422 updates and saves a date and time managed in the apparatus, and is backed up by a backup battery 423.

An E-IDE connector 439 connects an external storage device. In the first embodiment, the I/F connects a hard disk drive 438 to store image data in a hard disk 440 and read out image data from the hard disk 440. Connectors 427 and 432 connect to the scanner unit 301 and printer unit 303, respectively, and comprise asynchronous serial I/Fs 428 and 433 and video I/Fs 429 and 434.

The scanner I/F 426 connects to the scanner unit 301 via the connector 427 and to the main controller 401 via a scanner bus 441. The scanner I/F 426 has a function of performing a predetermined process for an image received from the scanner unit 301. The scanner I/F 426 also has a function of outputting to the scanner bus 441 a control signal generated on the basis of a video control signal sent from the scanner unit 301. The bus controller 403 controls data transfer from the scanner bus 441 to the DRAM 406.

The printer I/F 430 connects to the printer unit 303 via the connector 432. The printer I/F 430 connects to the main controller 401 via a printer bus 431. The printer I/F 430 has a function of performing a predetermined process for image data output from the main controller 401 and outputting the processed data to the printer unit 303. The printer I/F 430 also has a function of outputting to the printer bus 431 a control signal generated on the basis of a video control signal sent from the printer unit 303.

The bus controller 403 controls transfer of raster image data expanded in the DRAM 406 to the printer unit 303, and DMA-transfers the raster image data to the printer unit 303 via the printer bus 431 and video I/F 434.

An SRAM 436 can hold storage contents even after stopping power supplied from the backup battery to the whole digital multifunction peripheral. The SRAM 436 connects to the I/O control unit via a bus 435. An EEPROM 437 is a memory connected to the I/O control unit similarly via the bus 435. Details of the hardware arrangement of the controller unit 302 have been described.

<Arrangement of Operation Unit 304>

Figure 5:
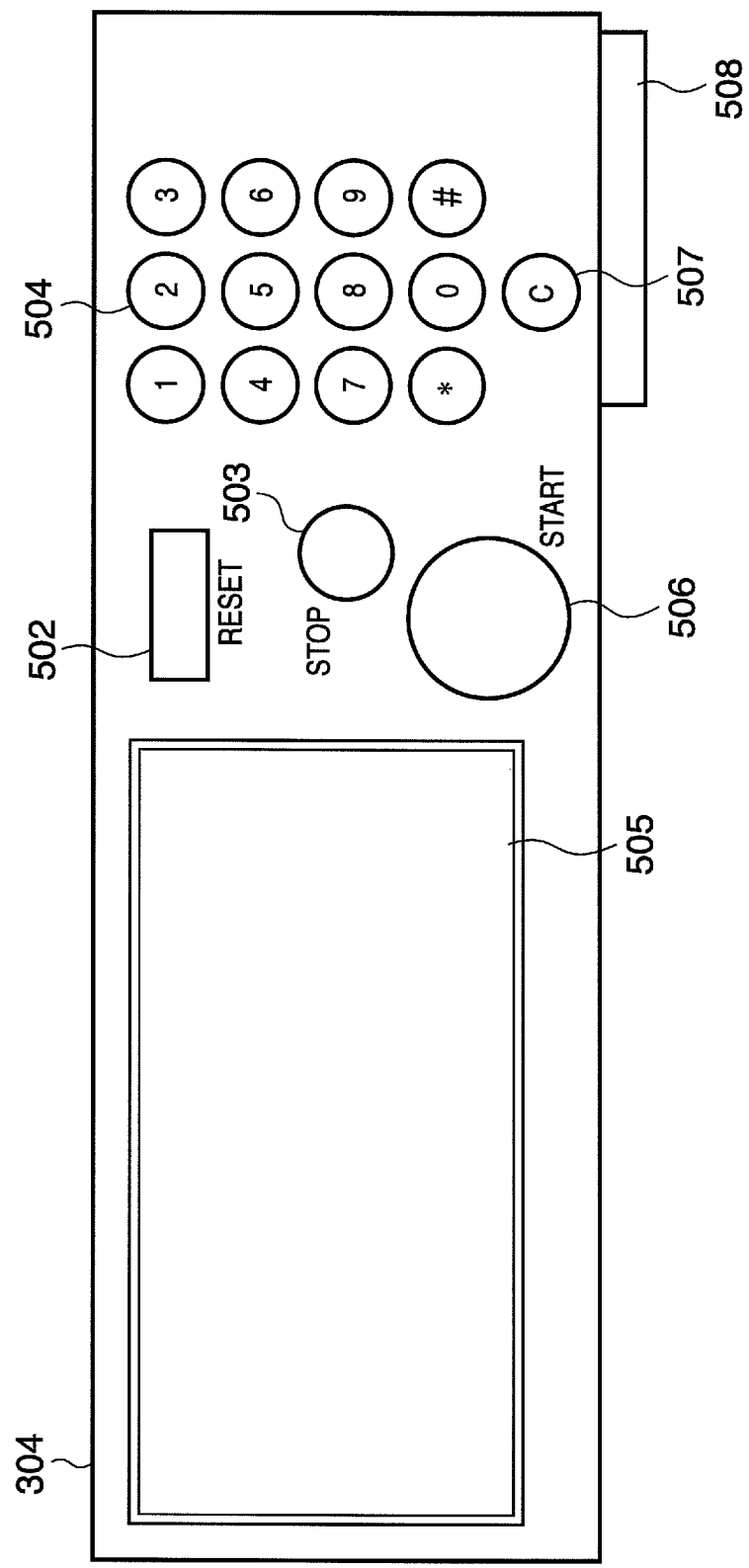
FIG. 5 is a view showing the arrangement of an operation unit 304 of the digital multifunction peripheral 102.

The arrangement of the operation unit 304 (user interface unit of the digital multifunction peripheral 102) for making various print settings will be explained. The operation unit 304 shown in FIG. 5 connects to the panel I/F 421 in FIG. 4. Reference numeral 502 denotes a reset key for canceling values or the like set by a user. Reference numeral 503 denotes a stop key used to stop a job in process. Reference numeral 504 denotes a ten-key pad for inputting numerical values such as an entry. Reference numeral 505 denotes a touch panel type operation screen which displays a window registered in advance and has many touch panel buttons for various settings. Reference numeral 506 denotes a start key for starting a job such as scanning of a document. Reference numeral 507 denotes a clear key for clearing settings and the like.

<Hardware Arrangements of Scanner Unit 301 and Printer Unit 303>

Figure 6:
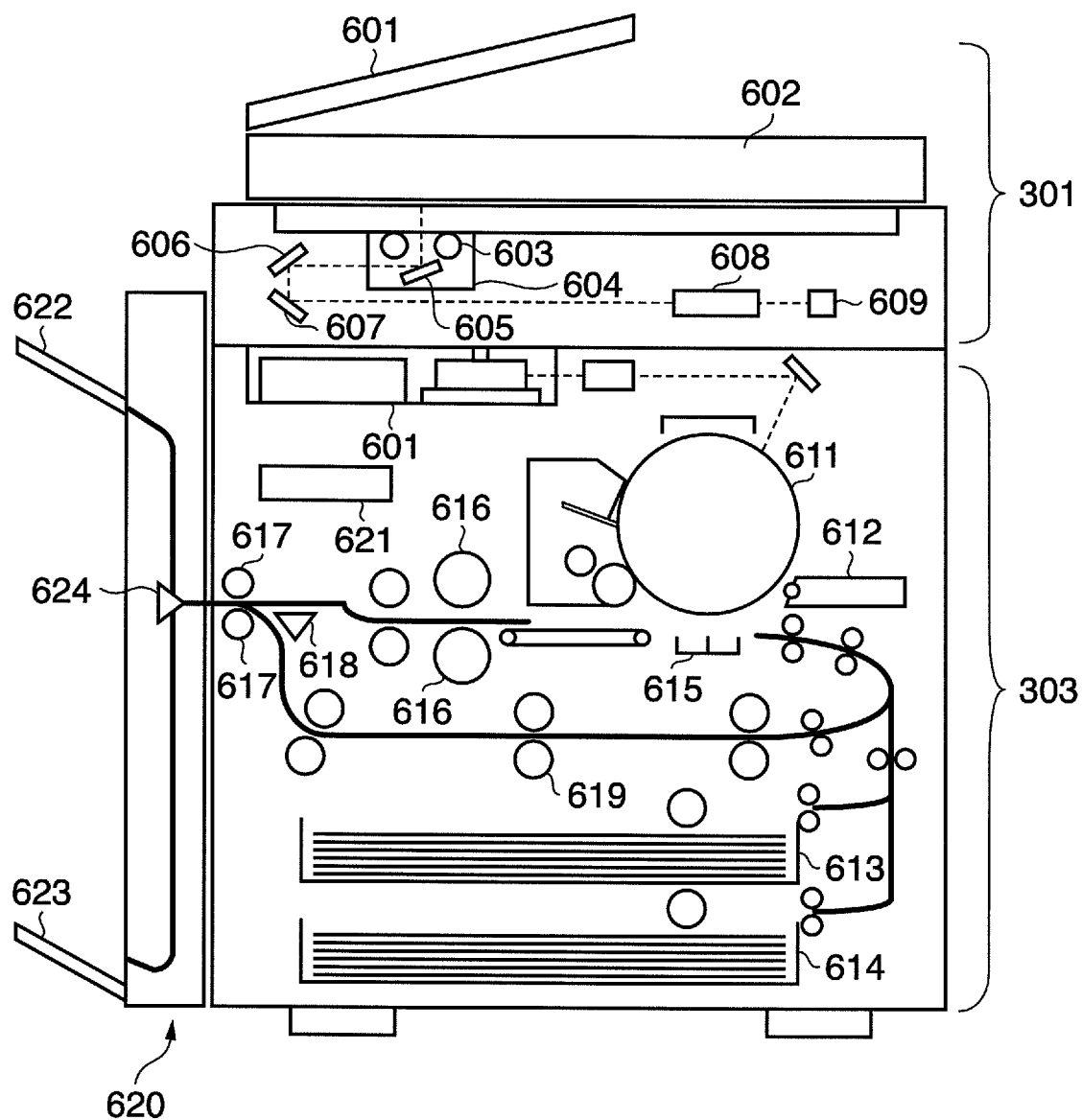
FIG. 6 is a sectional view of a scanner unit 301 and printer unit 303.

FIG. 6 is a sectional view of the scanner unit 301 and printer unit 303. A document feeder 601 of the scanner unit 301 feeds document pages one by one from the last page onto a platen glass 602. After the end of scanning the document page, the document feeder 601 discharges the document page from the platen glass 602.

After conveying the document onto the platen glass 602, a lamp 603 is turned on, and movement of a scanner unit 604 starts to expose and scan the document. Light reflected by the document is guided to a CCD image sensor 609 via mirrors 605, 606, 607, and 608.

The CCD 609 reads the scanned document image. Image data output from the CCD 609 undergoes a predetermined process, and is transferred to the printer unit 303 and the core of the image input/output control unit.

The printer unit 303 comprises a laser driver for driving a laser-emitting unit 610. The laser driver drives the laser-emitting unit 610 in accordance with image data output from the scanner unit 301 to emit a laser beam.

A printer control unit 621 connects to the outside via a network, processes input image data, and drives the laser-emitting unit 610 in accordance with the image data to emit a laser beam.

The laser beam is swept by a rotary polygon mirror, and irradiates a photosensitive drum 611 to form a latent image corresponding to exposure of the laser beam on the photosensitive drum 611. A developing unit 612 applies a developing agent to the latent image on the photosensitive drum 611. The amount of developing agent (e.g., toner) is calculated in consideration of an image data signal, a predetermined table (e.g., ICC profile), and printing conditions. Printing can be implemented with a toner amount suited to a printing medium by setting the toner amount in accordance with printing conditions. The printing medium master shown in FIG. 28 or the like preferably holds a proper toner amount corresponding to each medium. This setting enables a printing process using a toner amount proper to a selected medium.

At a timing synchronized with the start of laser beam irradiation, a printing medium is supplied from a paper feed tray 613 or 614 (the number of paper feed trays is not limited to two) or the like, and conveyed to a transfer portion 615 to transfer the developing agent applied to the photosensitive drum 611 onto the printing medium.

The printing medium bearing the developing agent is conveyed to fixing portions 616 to fix the developing agent onto the printing medium by the heat and pressure of the fixing portions 616. The temperature of the fixing portions 616 is changeable in accordance with printing conditions to implement fixing suitable for a printing medium. The printing medium master shown in FIG. 28 or the like preferably holds a fixing temperature corresponding to each medium. This setting enables a printing process using a fixing temperature proper to a selected medium.

Discharge rollers 617 discharge the printing medium having passed through the fixing portions 616. A sorter 620 stores and sorts discharged printing media at respective bins.

The top bin of the sorter 620 is a sample tray 622. In addition, the sorter 620 has a tray 623 capable of stacking a large number of outputs. A flapper 624 switches the discharge destination between the sample tray 622 and the tray 623.

When double-sided printing is set, the rotational direction of the discharge roller 617 is reversed to guide a printing medium to the refeed convey path by a flapper 618. When multiple printing is set, the flapper 618 guides a printing medium to the refeed convey path so as not to convey it to the discharge rollers 617. The printing medium guided to the refeed convey path is fed to the transfer portion 615 at the above-described timing.

<Arrangement of Client PC 101>

The arrangement of the client PC (information processing apparatus) 101 according to the first embodiment of the present invention will be explained.

Figure 7:
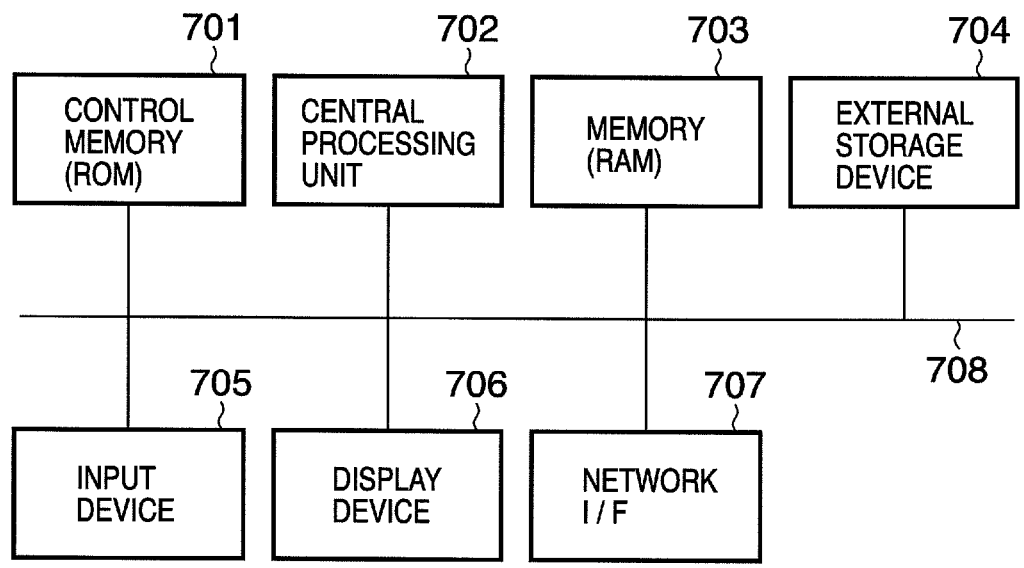
FIG. 7 is a block diagram showing the arrangement of a client PC according to the first embodiment of the present invention.

In FIG. 7, reference numeral 701 denotes a control memory (ROM); 702, a central processing unit (CPU); 703, a memory (RAM); 704, an external storage device; 705, an input device; 706, a display device; 707, a network I/F; and 708, a bus. The control memory 701 stores a control program for implementing an information processing function according to the first embodiment, and data used by the control program. The control programs and data are properly loaded into the memory 703 via the bus 708 under the control of the central processing unit 702, and executed by the central processing unit 702.

<Process Procedures in Client PC 101 in Printing>

Figure 8:
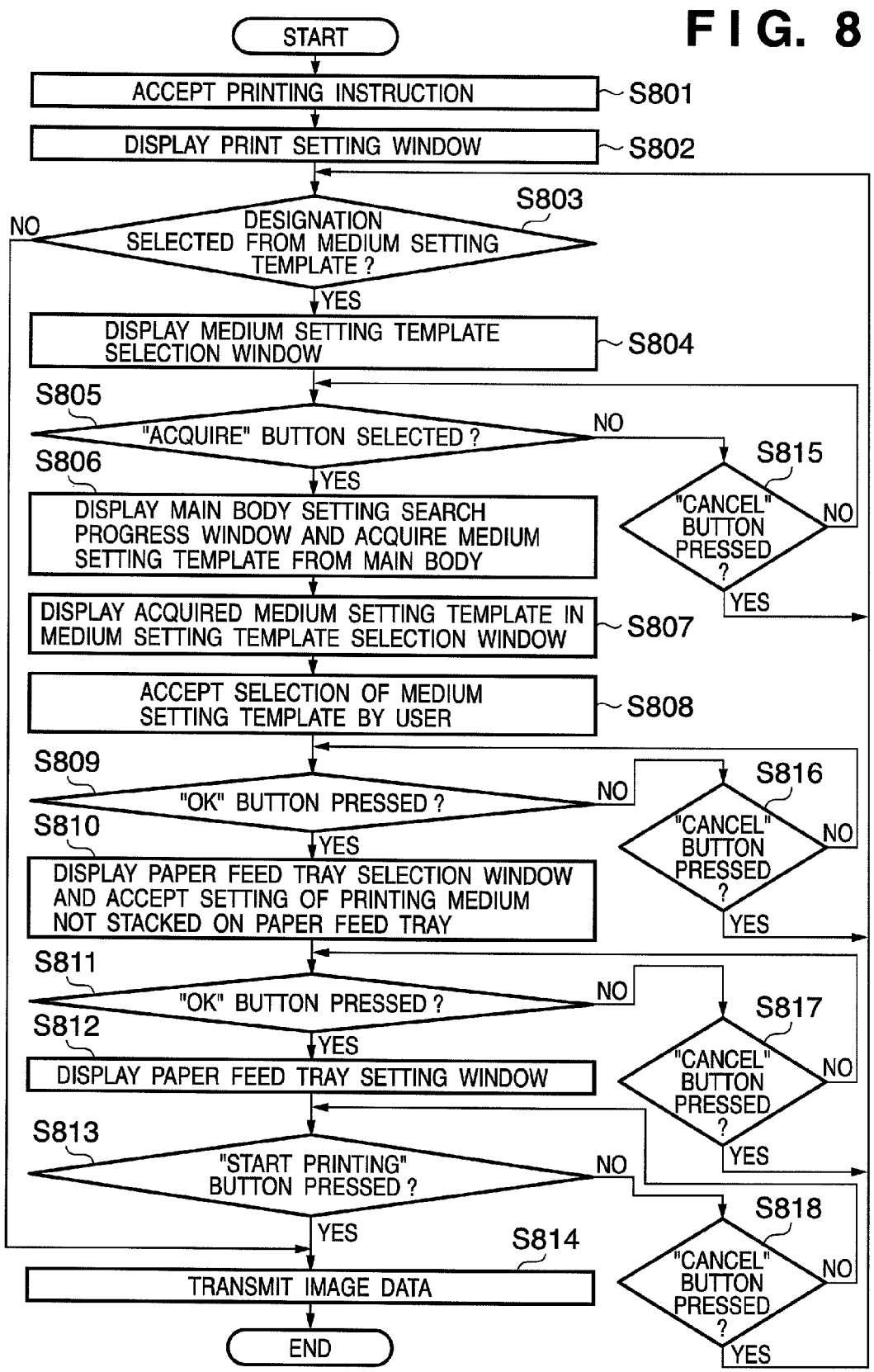
FIG. 8 is a flowchart showing process procedures in a client PC 101 when the digital multifunction peripheral 102 prints on the basis of image data transmitted from the client PC 101.

FIG. 8 is a flowchart showing process procedures in the client PC 101 when the digital multifunction peripheral 102 prints on the basis of image data transmitted from the client PC 101. The CPU 702 causes a printer driver (printer driver for the digital multifunction peripheral 102) installed in the client PC 101 to execute the following process. The user inputs various instructions and operations via the input device 705 serving as the user interface unit of the client PC 101. Examples of the input device 705 are a pointing device (e.g., a mouse or touch pad) and a keyboard. In the use of the user interface unit of the digital multifunction peripheral, the user can use the touch panel and hard keys of the operation unit 304.

Figure 9:
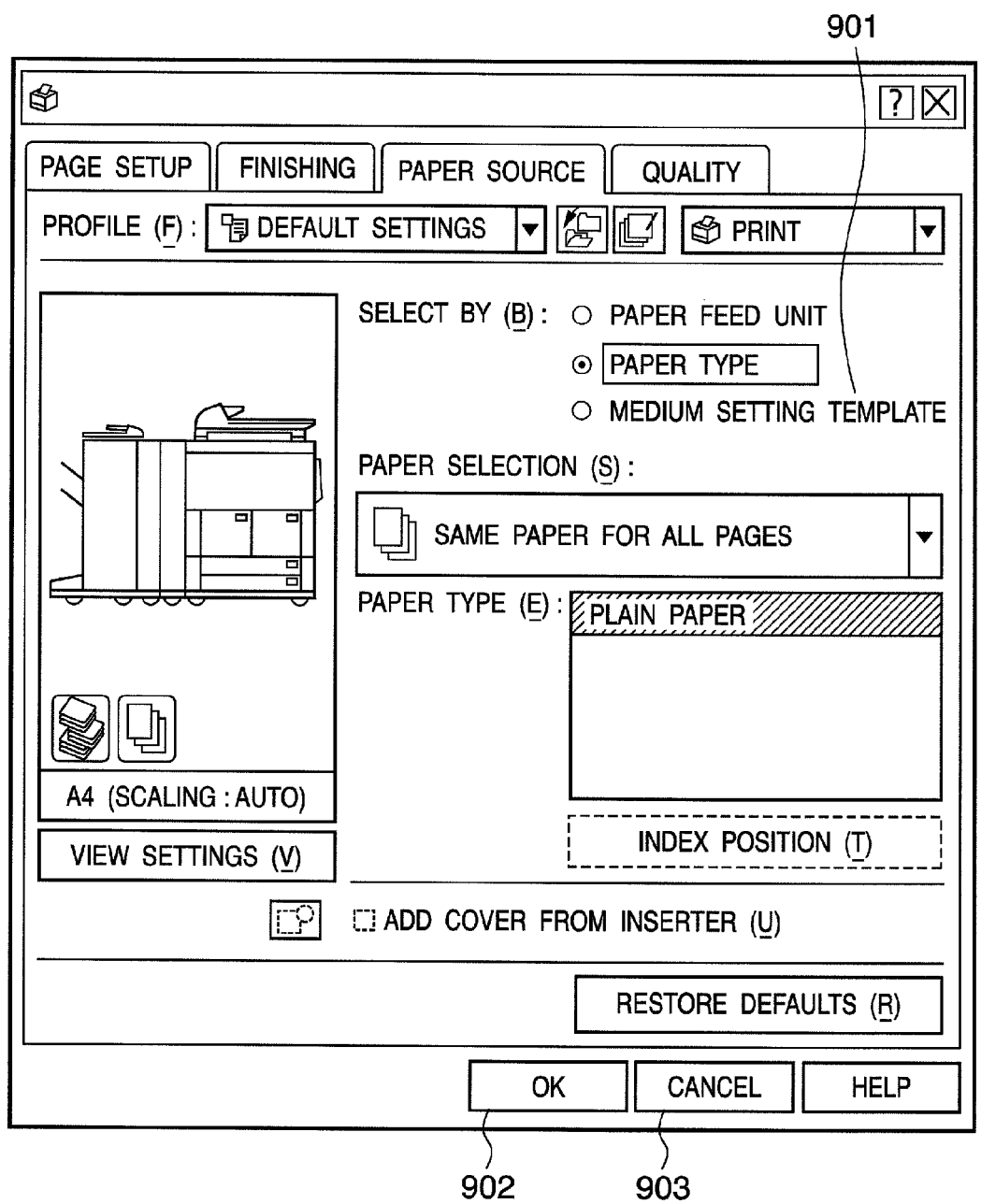
FIG. 9 is a view showing an example of a print setting window displayed on the client PC 101.

If the client PC 101 accepts a printing instruction from the user in step S801, the CPU 702 displays a print setting window shown in FIG. 9.

In step S803, the CPU 702 determines whether the user selects a "medium setting template" selection field 901 in the print setting window. If the CPU 702 determines that the user does not select the selection field 901, it executes a process in step S814.

Figure 10:
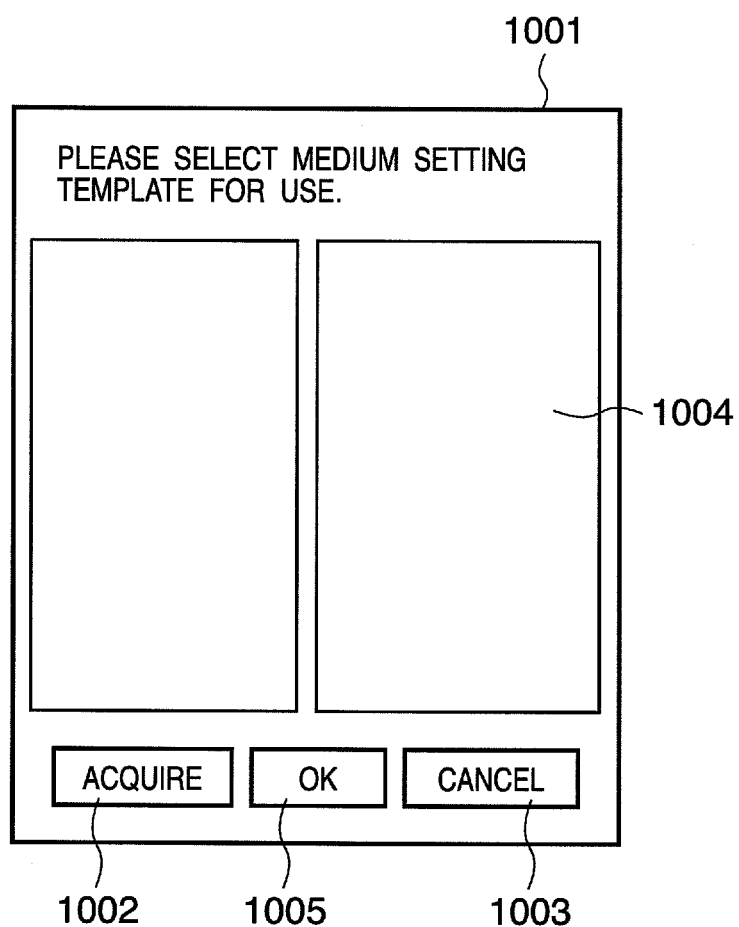
FIG. 10 is a view showing an example of a medium setting template selection window.

If the CPU 702 determines that the user selects the selection field 901, it causes the display unit 706 of the client PC 101 to display a medium setting template selection window 1001 shown in FIG. 10, as a process in step S804. As the display method, part of the displayed window or a new window may display the medium setting template selection window 1001. In step S805, the CPU 702 determines whether the user pressed an "acquire" button 1002 in the medium setting template selection window 1001. If the CPU 702 determines that the user did not press the "acquire" button 1002, the process advances to step S815 to determine whether the user pressed a "cancel" button 1003.

If the CPU 702 determines in step S815 that the user pressed the "cancel" button 1003, the process returns to step S803. If the CPU 702 determines that the user did not press the "cancel" button 1003, the process returns to step S805. At this time, the CPU 702 has not acquired the medium setting template 201 set in the digital multifunction peripheral 102, and a medium setting template selection window selection field 1004 is blank. In this case, the CPU 702 controls to inhibit the user from selecting an "OK" button 1005.

Figure 11:
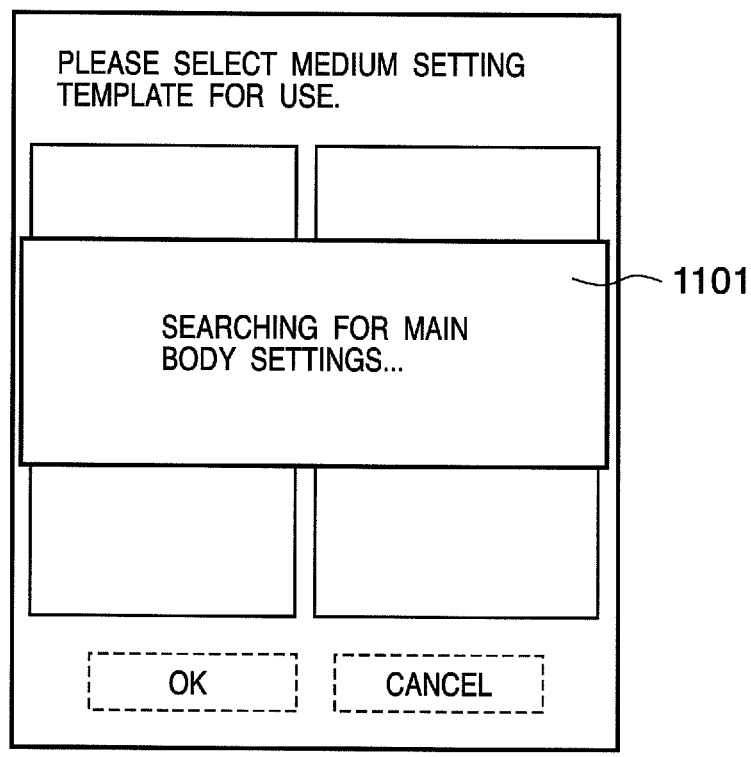
FIG. 11 is a view showing an example of a main body setting search progress window.

If the CPU 702 determines in step S805 that the user pressed the "acquire" button 1002, it executes a process in step S806 in response to an instruction from the user. In the process of step S806, the CPU 702 transmits, to the digital multifunction peripheral 102 via the network, a command to acquire the medium setting template 201 of the digital multifunction peripheral 102. At the same time, the CPU 702 causes the display unit 706 of the client PC 101 to display a main body setting search progress window 1101 shown in FIG. 11 presenting to the user that the client PC 101 is acquiring data of the medium setting template 201 from the digital multifunction peripheral 102. When the digital multifunction peripheral 102 receives this command, the controller unit 302 of the digital multifunction peripheral 102 reads out the medium setting template 201 from the memory 305, and transmits it to the client PC 101. The client PC 101 acquires, via the network, data of the medium setting template 201 held in the digital multifunction peripheral 102.

The controller unit 302 of the digital multifunction peripheral 102 also confirms paper feed tray information when reading out data of the medium setting template 201 from the memory 305. For each printing medium set in each medium setting template, the controller unit 302 also transmits, to the client PC 101, information representing whether the printing medium is currently set on the paper feed tray.

Figure 12:
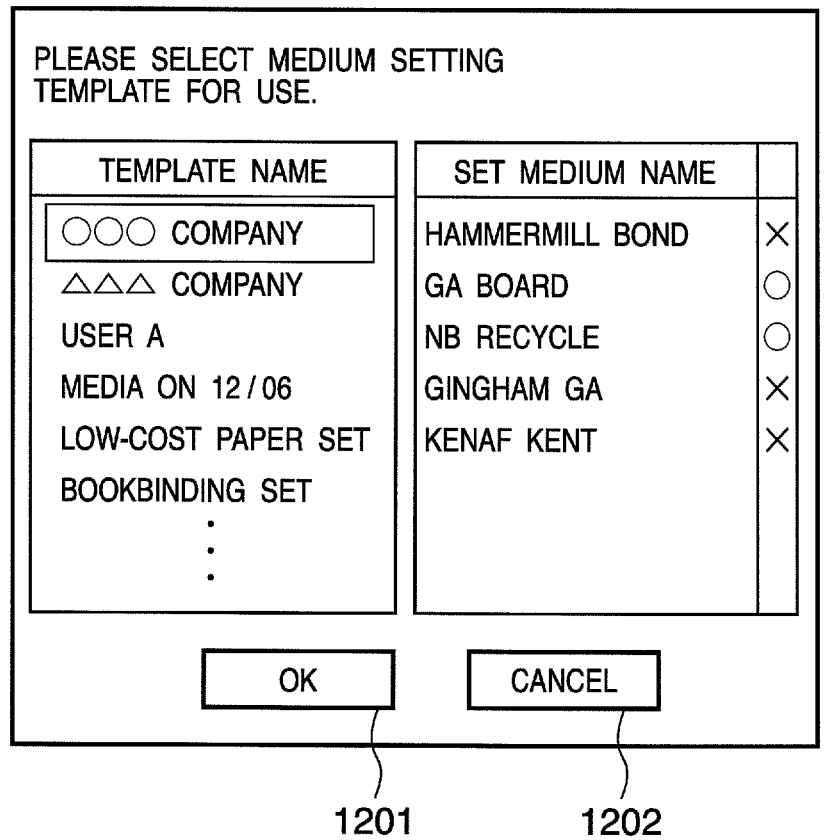
FIG. 12 is a view showing a state in which a medium setting template selection window 1001 displays a medium setting template acquired from the digital multifunction peripheral 102.

The CPU 702 of the client PC 101 executes a process in S807. When the client PC 101 acquires data of the medium setting template 201 from the digital multifunction peripheral 102, the CPU 702 of the client PC 101 causes the display unit 706 of the client PC 101 to display a window based on the data as shown in FIG. 12. At the same time, the CPU 702 of the client PC 101 also causes the display unit 706 of the client PC 101 to display information representing whether each printing medium set in each medium setting template is currently set on the paper feed tray. The medium setting template 201 can be acquired by several methods, which will be described below. For example, data of only a template name (identifier) is acquired, and options associated with the selected template name are further acquired upon acceptance of identifier selection. All data as shown in FIG. 27 may be acquired at once.

Figure 29:
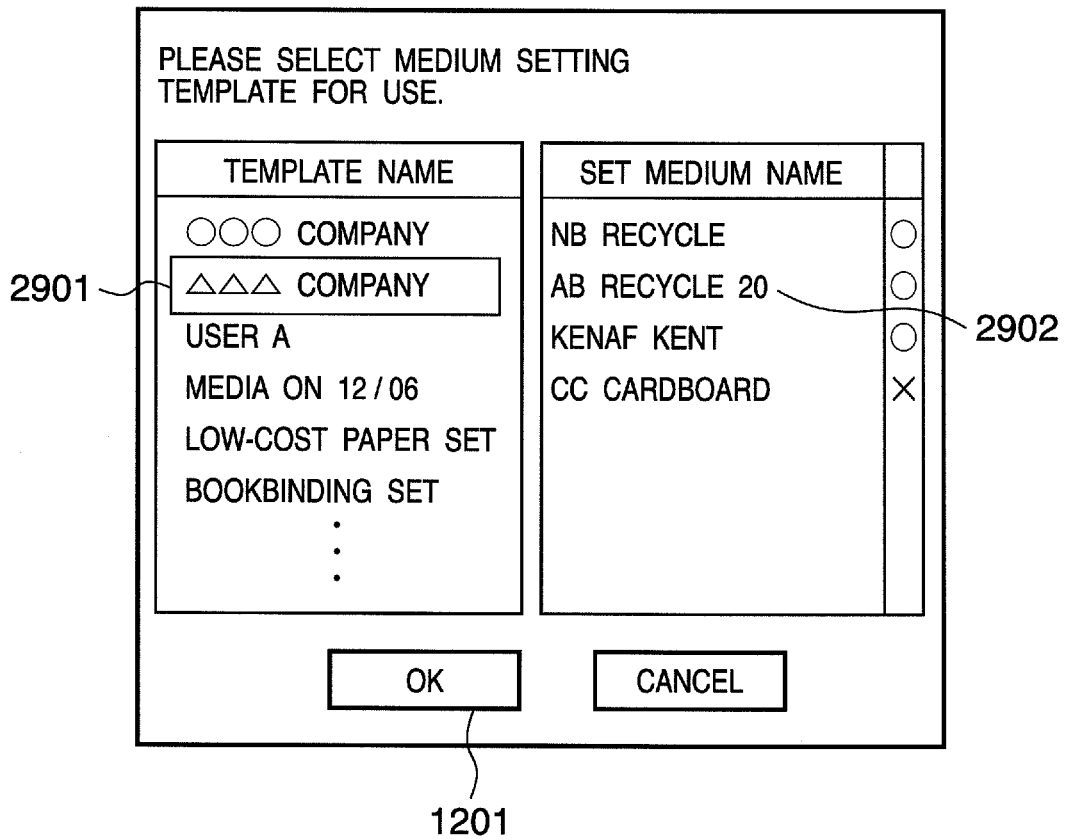
FIG. 29 is a view showing a state in which, after selecting an identifier in the medium setting template acquired by the digital multifunction peripheral 102, set medium names associated with the selected identifier are displayed.

In step S808, the CPU 702 accepts selection of a medium setting template by the user. In FIG. 12, the user selects "OOO company". In step S809, the CPU 702 determines whether the user pressed an "OK" button 1201. If the CPU 702 determines that the user did not press the "OK" button 1201, the process advances to step S816 to determine whether he pressed a "cancel" button 1202. If the CPU 702 determines that the user pressed the "cancel" button 1202, the process returns to step S803. If the CPU 702 determines that the user did not press the "cancel" button 1202, the process returns to step S809. FIG. 29 shows a case where the user selects "ΔΔΔ company" as an identifier. In response to selection of "ΔΔΔ company", the CPU 702 searches the table as shown in FIG. 27 for options associated with "ΔΔΔ company". As shown in FIG. 29, the CPU 702 causes the display unit 706 of the client PC 101 to display the associated options, as shown in FIG. 29. Since options to be displayed change in accordance with user's selection, the user can easily determine options associated with an identifier and achieve efficient setting work.

Figure 13:
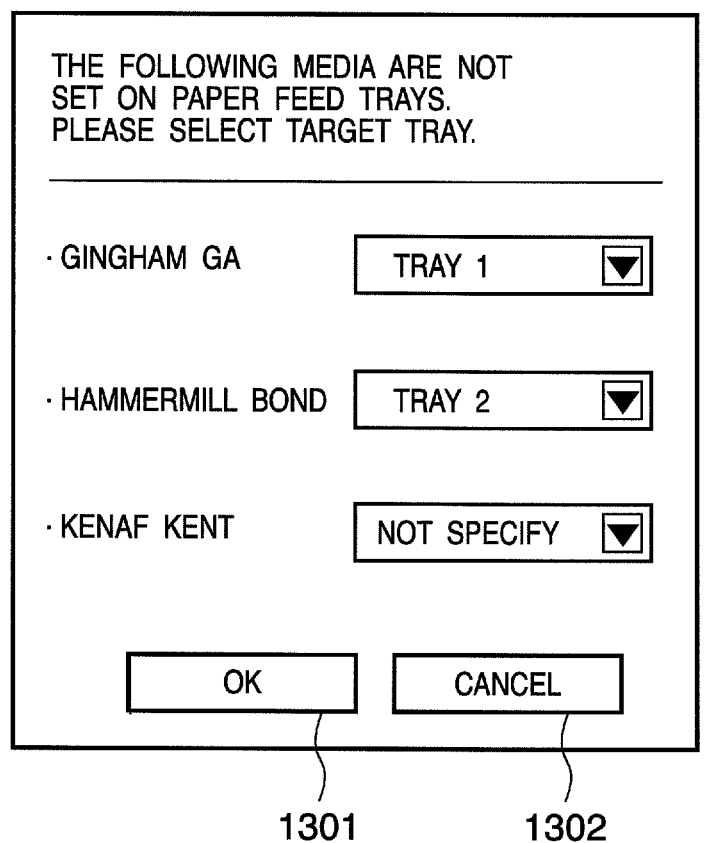
FIG. 13 is a view showing an example of a paper feed tray selection window.

If the CPU 702 determines in step S809 that the user pressed the "OK" button 1201, the process advances to step S810 to display a paper feed tray selection window shown in FIG. 13. In the paper feed tray selection window shown in FIG. 13, the user selects which of paper feed trays is used to set printing media.

In step S811, the CPU 702 determines whether the user pressed an "OK" button 1301 in the paper feed tray selection window (FIG. 13). If the user did not press the "OK" button 1301, the process advances to step S817 to determine whether he pressed a "cancel" button 1302. If the user did not press the "cancel" button 1302, the process returns to step S811. If the CPU 702 determines that the user pressed the "cancel" button 1302, the process returns to step S803.

Figure 14:
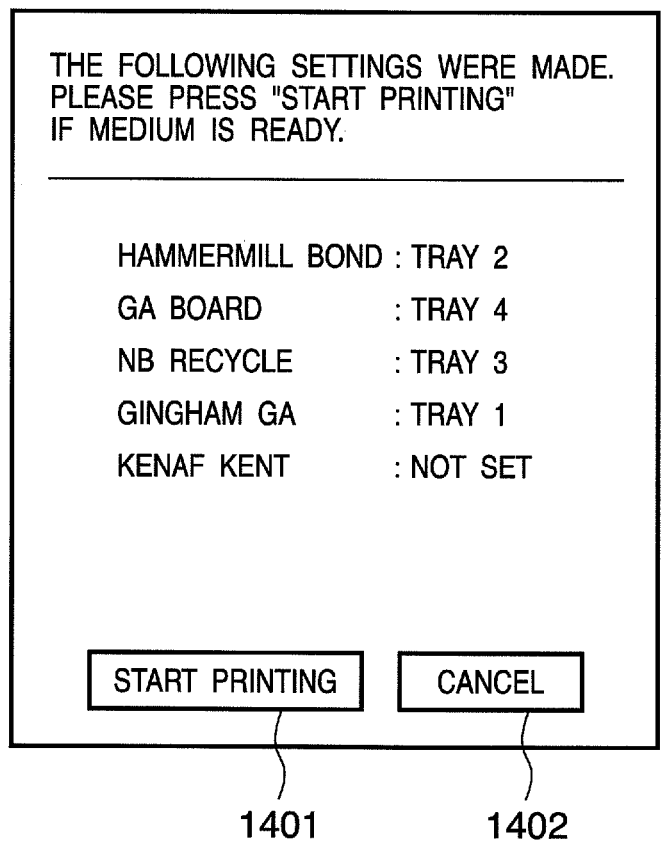
FIG. 14 is a view showing an example of a paper feed tray setting window.

If the CPU 702 determines in step S811 that the user pressed the "OK" button 1301, the process advances to step S812 to display a paper feed tray setting window shown in FIG. 14. The digital multifunction peripheral 102 recognizes that printing media are set on respective paper feed trays as displayed in the paper feed tray setting window shown in FIG. 14. In other words, the operator must set printing media in respective paper feed trays as displayed in the paper feed tray setting window shown in FIG. 14.

In step S813, the CPU 702 determines whether the user pressed a "start printing" button 1401 in the paper feed tray setting window (FIG. 14). If the CPU 702 determines in step S813 that the user pressed the "start printing" button 1401, the process advances to step S814 to add the setting contents to image data to be printed, and transmit the resultant data to the digital multifunction peripheral 102.

If the CPU 702 determines in step S813 that the user did not press the "start printing" button 1401, the process advances to step S818 to determine whether he pressed a "cancel" button 1402. If the CPU 702 determines that the user pressed the "cancel" button 1402, the process returns to step S803. If the CPU 702 determines in step S818 that the user did not press the "cancel" button 1402, the process returns to step S813.

The CPU 702 completes transmission of image data in step S814, and the process ends. The digital multifunction peripheral 102 recognizes the type of printing medium set by the operator on each paper feed tray. The digital multifunction peripheral 102 selects one of paper feed trays and prints out data under other printing conditions set in the print setting window of FIG. 9.

As is apparent from the above description, the digital multifunction peripheral according to the first embodiment has the medium setting template. The client PC according to the first embodiment can selectively display the template name of the medium setting template when inputting printing conditions via the digital multifunction peripheral in printing.

By only selecting the template name, the user can set, in the digital multifunction peripheral, information (printing medium option) representing the attributes of a printing medium set on each paper feed tray. That is, the user can avoid work to select predetermined information from pieces of information representing the attributes of an enormous number of printing media and make settings for each paper feed tray. As a result, the first embodiment can reduce the burden of setting work.

When a plurality of printing media associated with each template name do not correspond to paper feed trays, a paper feed tray can be selectively set.

Concrete cases will be further explained on the basis of the above-described flowchart and various processes. These cases will be described using an example of transmitting data together with printing conditions from the client PC 101 to the digital multifunction peripheral 102 via the network 103 and printing.

Control Example 1

The CPU 702 of the client PC 101 prompts the user of the client PC 101 to use the input device 705 of the client PC 101 and select print data (document data) to be printed by the digital multifunction peripheral 102. This job will be called job A. The CPU 702 causes the display device 706 of the client PC 101 to display the print setting window as shown in FIG. 9, upon acceptance of an instruction to print data of job A. At this time, the client PC 101 has not transmitted print data to the digital multifunction peripheral 102.

In response to press of the "medium setting template" key 901 in the window of FIG. 9 by the user of the client PC 101, the CPU 702 of the client PC 101 causes the display device 706 of the client PC 101 to display the medium setting template selection window as shown in FIG. 10.

In response to press of the "acquire" button 1002 in FIG. 10 by the user of the client PC 101, the CPU 702 transmits, from the client PC 101 to the digital multifunction peripheral 102, a request command to acquire data of the medium setting template 201 held in the memory 305 of the digital multifunction peripheral 102. Even at this time, the client PC 101 has not transmitted print data of job A to the digital multifunction peripheral 102. In response to press of the button 1002 by the user of the client PC 101, the CPU 702 causes the display device 706 of the client PC 101 to display information notifying the user of the client PC 101 that the client PC 101 is acquiring data of the medium setting template 201 from the digital multifunction peripheral 102. FIG. 11 shows an example of this display control.

When the digital multifunction peripheral 102 receives the command, the controller unit 302 of the digital multifunction peripheral 102 executes the following process. The controller unit 302 of the digital multifunction peripheral 102 reads out data of the medium setting template 201 as shown in FIG. 27 from the memory 305 of the digital multifunction peripheral 102. The controller unit 302 of the digital multifunction peripheral 102 controls the digital multifunction peripheral 102 to transmit the readout data of the medium setting template 201 to the command-transmitting client PC 101.

FIG. 1 shows only one client PC. However, even when a plurality of client PCs connect to the network, the digital multifunction peripheral 102 can exchange data of the medium setting template 201 with these PCs. For example, when the digital multifunction peripheral 102 receives, from one of the PCs, a request to acquire the medium setting template 201, the controller unit 302 of the digital multifunction peripheral 102 specifies the requesting PC on the basis of IP information or the like. The controller unit 302 controls to transmit data of the medium setting template to the client PC which has transmitted the request command to acquire the medium setting template 201. Accordingly, the digital multifunction peripheral 102 can unitarily manage data of the medium setting template 201, improving the operability of the operator in the use of a plurality of client PCs.

When the client PC 101 receives data of the medium setting template 201 from the digital multifunction peripheral 102, the CPU 702 of the client PC 101 causes the display device 706 to display the medium setting template selection window shown in FIG. 12. The contents displayed on the display device 706 by the CPU 702 of the client PC 101 are based on data of the medium setting template 201 received from the digital multifunction peripheral 102. When displaying data of the medium setting template 201 on the display device 706 of the client PC 101, the CPU 702 causes the display device 706 to display a list of data of the medium setting template 201 so that the user can identify the correspondence between an identifier and options for printing media available in the digital multifunction peripheral 102. FIG. 12 shows an example of the list.

A case where the user of the client PC 101 selects "OOO company" in the window of FIG. 12 via the user interface unit of the client PC 101 will be explained. The CPU 702 displays options (called set medium names in the first embodiment) associated with the identifier "OOO company" on the basis of data of the medium setting template 201 acquired from the digital multifunction peripheral 102. In the example of FIG. 12, the CPU 702 of the client PC 101 displays the following set medium names as the set medium names of printing media associated with "OOO company". That is, the CPU 702 displays set medium names "Hammermill bond", "GA board", "NB recycle", "gingham GA", and "kenaf Kent".

According to the first embodiment, the CPU 702 controls to display, on the display unit of the client PC 101, a list of identifiers associated with a plurality of printing media available in the digital multifunction peripheral 102 in printing, on the basis of data of the medium setting template 201 acquired from the digital multifunction peripheral 102. In addition, the CPU 702 controls to allow the user of the client PC 101 to select a desired one of identifiers from the list. The CPU 702 controls to display, on the display unit of the client PC 101, a list of options (set media) associated with one identifier in response to selection of one identifier from the display list by the user of the client PC 101. The CPU 702 controls to allow the user of the client PC 101 to select one of the options via the user interface unit.

In this example, assume that the user of the client PC 101 selects "GA board" from the set medium name list and presses the "OK" button 1201 via the input device 705. In this case, the CPU 702 of the client PC 101 transmits print data of job A and print setting-related data (commands) from the client PC 101 to the digital multifunction peripheral 102.

Data related to print settings (printing conditions) of job A transmitted from the client PC 101 contains data on the setting of single- or double-sided printing, data on the number of copies, and data on finishing. Further, data related to print settings of job A contains data representing that the user of the client PC 101 designates the identifier "OOO company", and data representing that the user of the client PC 101 designates the option of the set medium name "GA board" associated with this identifier. The CPU 702 of the client PC 101 controls the client PC 101 to transmit various printing process condition parameters and print data as data of job A to the digital multifunction peripheral 102.

When the digital multifunction peripheral 102 receives data of job A from the client PC 101, the controller unit 302 of the digital multifunction peripheral 102 executes the following control. The controller unit 302 of the digital multifunction peripheral 102 causes the digital multifunction peripheral 102 to select, as the printing medium of job A, a printing medium corresponding to the option (GA board) designated via the user interface unit of the client PC 101. The controller unit 302 of the digital multifunction peripheral 102 causes the printer unit 303 to print an image based on print data of job A on the selected printing medium.

When the printer unit 303 is to execute the printing process of job A, the controller unit 302 of the digital multifunction peripheral 102 controls the printer unit 303 to execute the printing process using attribute data of the printing medium of job A. In this example, the user of the client PC 101 designates "GA board" for job A. By using information for job A, the controller unit 302 reads out attribute data of "GA board" from the printing medium table shown in FIG. 28 which is held in the memory 305 and linked to the medium setting template 201. In the example of FIG. 28, the controller unit 302 reads out attribute data such as "thickness: 18", "color: light blue", and "fixing temperature: XX° C." which are also engine parameters directly related to the printer engine. The controller unit 302 causes the printer unit 303 to execute printing of job A by a printing process based on the attribute data (e.g., "thickness: 18", "color: light blue", and "fixing temperature: XX° C.") of the printing medium corresponding to the option designated in job A. By controlling the printing process of the printer unit 303, the controller unit 302 can execute printing complying with parameters unique to the printing medium for job A.

Control Example 2

The CPU 702 of the client PC 101 prompts the user of the client PC 101 to use the input device 705 of the client PC 101 and select print data (document data) to be printed by the digital multifunction peripheral 102. This job will be called job B in order to discriminate it from job A described in Control Example 1. The CPU 702 causes the display device 706 of the client PC 101 to display the print setting window as shown in FIG. 9, upon acceptance of an instruction to print data of job B. At this time, the client PC 101 has not transmitted print data to the digital multifunction peripheral 102.

In response to press of the "medium setting template" key 901 in the window of FIG. 9 by the user of the client PC 101, the CPU 702 of the client PC 101 causes the display device 706 of the client PC 101 to display the medium setting template selection window as shown in FIG. 10.

In response to press of the "acquire" button 1002 in FIG. 10 by the user of the client PC 101, the CPU 702 transmits, from the client PC 101 to the digital multifunction peripheral 102, a request command to acquire data of the medium setting template 201 held in the memory of the digital multifunction peripheral 102. Even at this time, the client PC 101 has not transmitted print data of job B to the digital multifunction peripheral 102. In response to press of the button 1002 by the user of the client PC 101, the CPU 702 causes the display device 706 of the client PC 101 to display information notifying the user of the client PC 101 that the client PC 101 is acquiring data of the medium setting template 201 from the digital multifunction peripheral 102. FIG. 11 shows an example of this display control.

When the digital multifunction peripheral 102 receives the command, the controller unit 302 of the digital multifunction peripheral 102 executes the following process. The controller unit 302 of the digital multifunction peripheral 102 reads out data of the medium setting template 201 as shown in FIG. 27 from the memory 305 of the digital multifunction peripheral 102. The controller unit 302 of the digital multifunction peripheral 102 controls the digital multifunction peripheral 102 to transmit the readout data of the medium setting template 201 to the command-transmitting client PC 101.

When the client PC 101 receives data of the medium setting template 201 from the digital multifunction peripheral 102, the CPU 702 of the client PC 101 causes the display device 706 to display the medium setting template selection window shown in FIG. 12. The contents displayed on the display device 706 by the CPU 702 of the client PC 101 are based on data of the medium setting template 201 received from the digital multifunction peripheral 102. When displaying data of the medium setting template 201 on the display device 706 of the client PC 101, the CPU 702 causes the display device 706 to display a list of data of the medium setting template 201 so that the user can identify the correspondence between an identifier and options for printing media available in the digital multifunction peripheral 102. FIG. 12 shows an example of the list.

A case where the user of the client PC 101 selects "ΔΔΔ company" in the window of FIG. 12 via the user interface unit of the client PC 101 will be explained. The CPU 702 displays options (called set medium names in the first embodiment) associated with the identifier "ΔΔΔ company" on the basis of data of the medium setting template 201 acquired from the digital multifunction peripheral 102. In the example of FIG.

29, the CPU 702 of the client PC 101 displays the following set medium names as the set medium names of printing media associated with "ΔΔΔ company". That is, the CPU 702 displays set medium names "NB recycle", "AB recycle 20", "kenaf Kent", and "CC cardboard".

According to the first embodiment, the CPU 702 controls to display, on the display unit of the client PC 101, a list of identifiers associated with a plurality of printing media available in the digital multifunction peripheral 102 in printing, on the basis of data of the medium setting template 201 acquired from the digital multifunction peripheral 102. In addition, the CPU 702 controls to allow the user of the client PC 101 to select a desired one of identifiers from the list. The CPU 702 controls to display, on the display unit of the client PC 101, a list of options (set media) associated with one identifier in response to selection of one identifier from the display list by the user of the client PC 101. The CPU 702 controls to allow the user of the client PC 101 to select one of the options via the user interface unit.

In this example, assume that the user of the client PC 101 selects "AB recycle 20" from the set medium name list and presses the "OK" button 1201 via the input device 705. In this case, the CPU 702 of the client PC 101 transmits print data of job B and print setting-related data (commands) from the client PC 101 to the digital multifunction peripheral 102.

Data related to print settings (printing conditions) of job B transmitted from the client PC 101 contains data on the setting of single- or double-sided printing, data on the number of copies, and data on finishing. Further, data related to print settings of job B contains data representing that the user of the client PC 101 designates the identifier "ΔΔΔ company", and data representing that the user of the client PC 101 designates the option of the set medium name "AB recycle 20" associated with this identifier. The CPU 702 of the client PC 101 controls the client PC 101 to transmit various printing process condition parameters and print data as data of job B to the digital multifunction peripheral 102.

When the digital multifunction peripheral 102 receives data of job B from the client PC 101, the controller unit 302 of the digital multifunction peripheral 102 executes the following control. The controller unit 302 of the digital multifunction peripheral 102 causes the digital multifunction peripheral 102 to select, as the printing medium of job B, a printing medium corresponding to the option (AB recycle 20) designated via the user interface unit of the client PC 101. The controller unit 302 of the digital multifunction peripheral 102 causes the printer unit 303 to print an image based on print data of job B on the selected printing medium.

When the printer unit 303 is to execute the printing process of job B, the controller unit 302 of the digital multifunction peripheral 102 controls the printer unit 303 to execute the printing process using attribute data of the printing medium of job B. In this example, the user of the client PC 101 designates "AB recycle 20" for job B. By using information for job B, the controller unit 302 reads out attribute data of "AB recycle 20" from the printing medium table shown in FIG. 28 which is held in the memory 305 and linked to the medium setting template 201. In the example of FIG. 28, the controller unit 302 reads out attribute data such as "thickness: 21", "color: white", and "fixing temperature: XX° C." which are also engine parameters directly related to the printer engine. The controller unit 302 causes the printer unit 303 to execute printing of job B by a printing process based on the attribute data (e.g., "thickness: 21", "color: white", and "fixing temperature: XX° C.") of the printing medium corresponding to the option designated in job B. By controlling the printing process of the printer unit 303, the printer unit 303 can execute printing complying with parameters unique to the printing medium for job B.

Second Embodiment

In the first embodiment, the digital multifunction peripheral 102 prints image data transmitted from the client PC 101. However, the present invention is not limited to this, and is also applicable to a case where the digital multifunction peripheral 102 prints (i.e., copies) image data generated by, e.g., scanning a document by the scanner unit 301. When the digital multifunction peripheral 102 prints image data held in the client PC 101, the user makes settings via a window displayed on the client PC 101. However, in copying by the digital multifunction peripheral 102, the user can make various settings on the operation screen 505 of the digital multifunction peripheral 102. Details of the second embodiment will be described below.

<Process Procedures in Digital Multifunction Peripheral in Copying>

Figure 15:
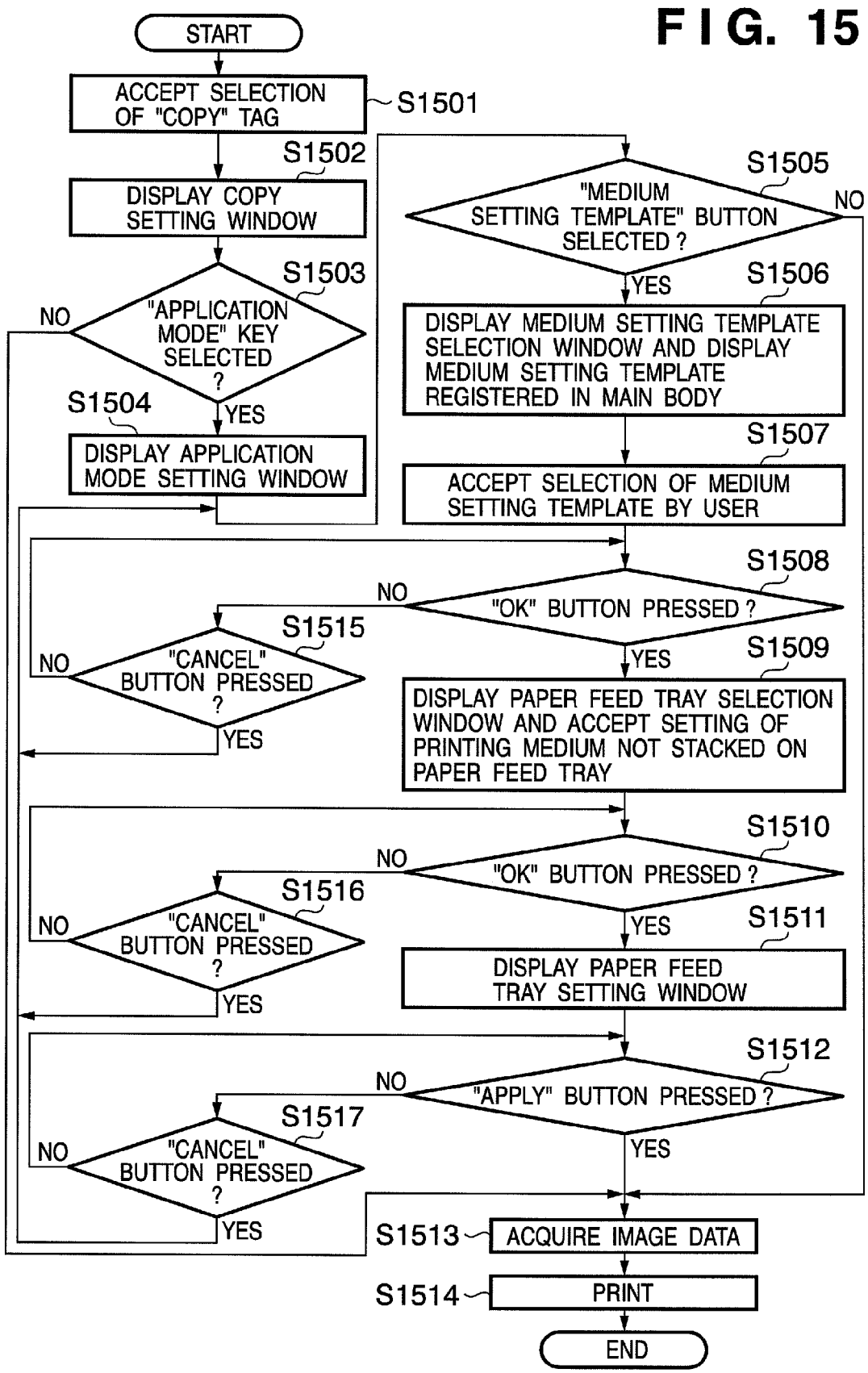
FIG. 15 is a flowchart showing process procedures in the digital multifunction peripheral in order to select a medium setting template in copying.

FIG. 15 is a flowchart showing process procedures in the digital multifunction peripheral in order to select a medium setting template 201 in copying. When the user selects a "copy" tab on an operation screen 505 (step S1501), the operation screen 505 displays a copy setting window shown in FIG. 16 in step S1502.

Figure 16:
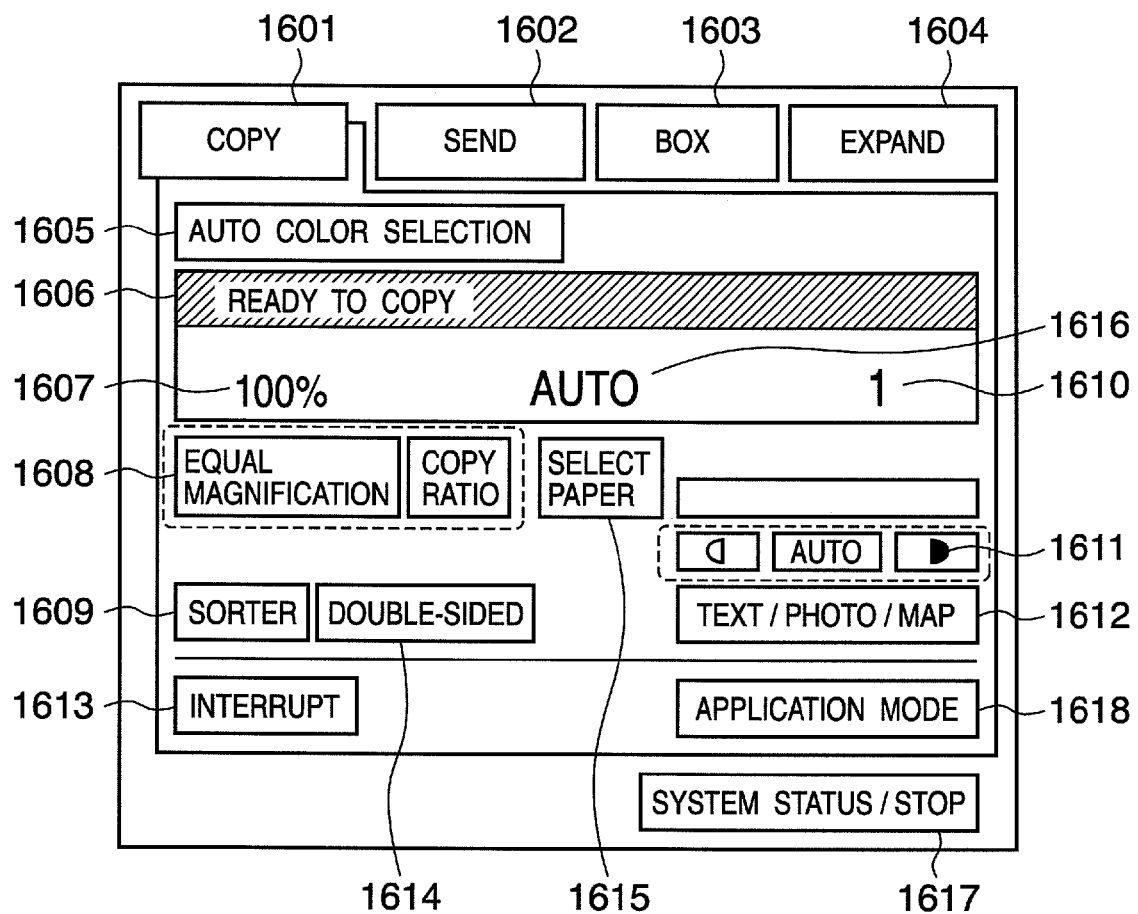
FIG. 16 is a view showing an example of a copy setting window.

FIG. 16 is a view showing an example of the copy setting window. Reference numeral 1605 denotes a color selection setting key; 1606, a status display portion; 1607, a scaling display portion; 1608, a scaling setting key; 1609, a sorting method selection key; 1610, a copy count display portion; 1611, a density setting key; 1612, an image mode setting key; 1613, an interrupt key; 1614, a double-sided setting key; 1615, a paper size setting key; 1616, a paper size display portion; 1617, a system monitor key; and 1618, an application mode key.

The operation screen 505 of a digital multifunction peripheral 102 has a "send" tab 1602, "box" tab 1603, and "expand" tab 1604 in addition to a "copy" tab 1601, and allows settings on them, but a detailed description thereof will be omitted.

Referring back to FIG. 15, the digital multifunction peripheral 102 determines whether the user pressed the application mode key 1618. If the user pressed a start key 506 without pressing the application mode key 1618, the process advances to step S1513 to start printing.

Figure 17:
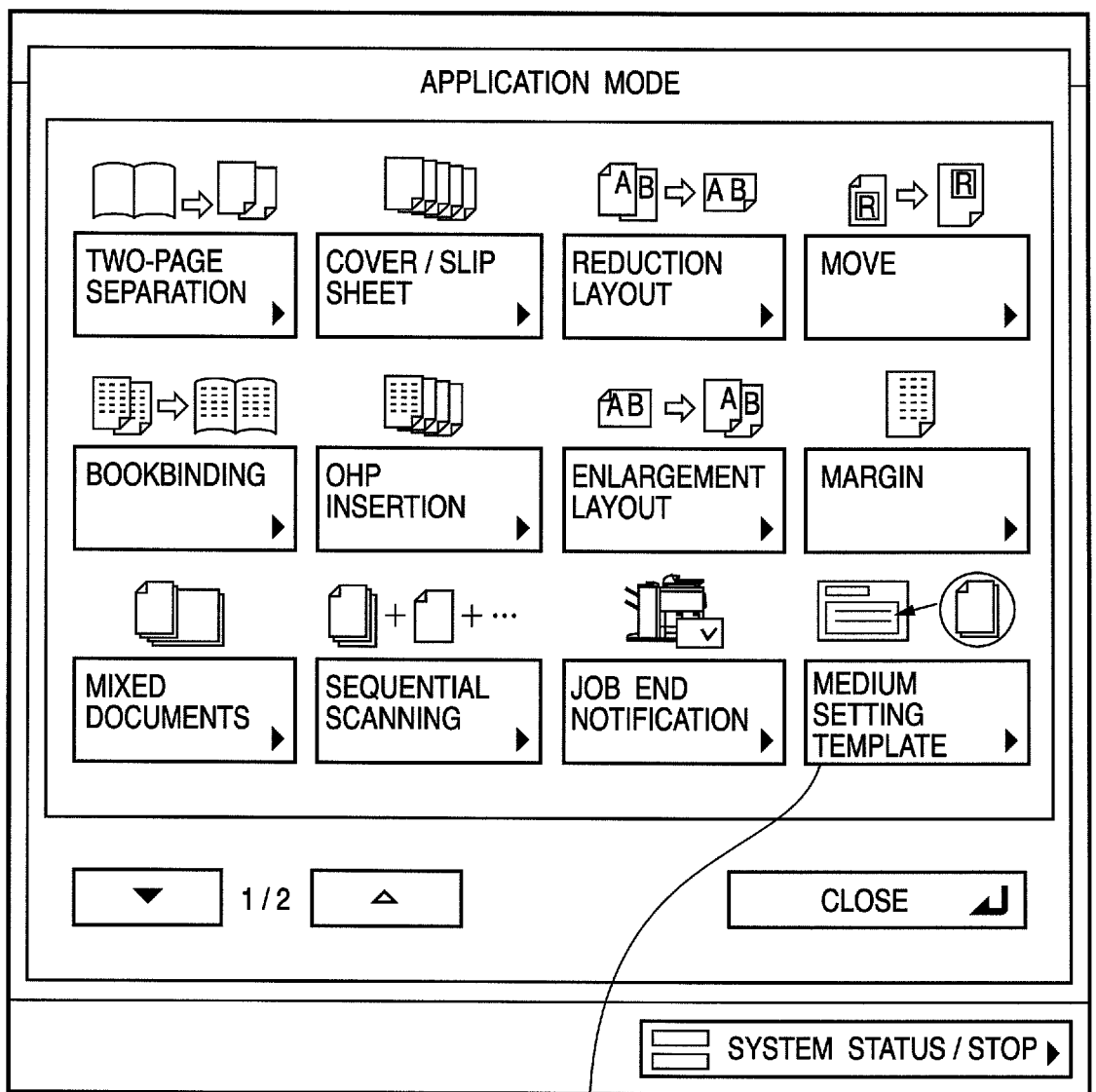
FIG. 17 is a view showing an example of an application mode setting window.

If the digital multifunction peripheral 102 determines in step S1503 that the user pressed the application mode key 1618, the process advances to step S1504 to display an application mode setting window shown in FIG. 17.

In step S1505, the digital multifunction peripheral 102 determines whether the user pressed a "medium setting template" button 1701. If the digital multifunction peripheral 102 determines in step S1505 that the user did not press the "medium setting template" button 1701, the process advances to step S1513 to start printing.

Figure 18:
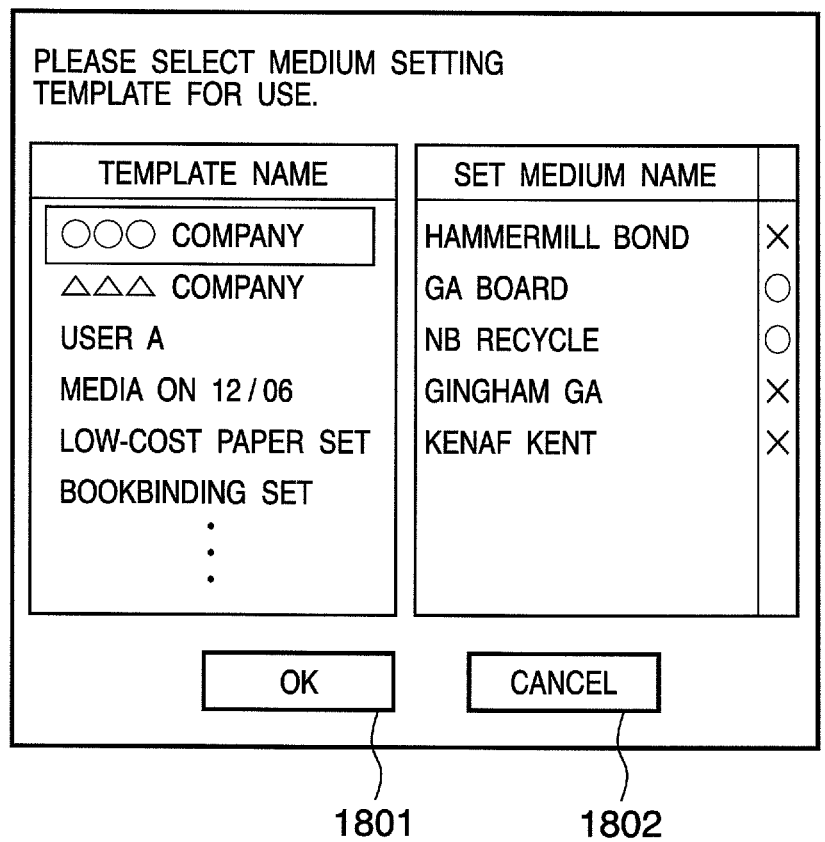
FIG. 18 is a view showing an example of a medium setting template selection window.

If the digital multifunction peripheral 102 determines in step S1505 that the user pressed the "medium setting template" button 1701, the process advances to step S1506 to display a medium setting template selection window shown in FIG. 18. This window displays the medium setting template 201 registered in the digital multifunction peripheral 102. At this time, the digital multifunction peripheral 102 confirms paper feed tray information. For each printing medium set in the medium setting template, the digital multifunction peripheral 102 also displays information representing whether the printing medium is currently set on the paper feed tray.

The user confirms the contents of the displayed medium setting template, and selects contents corresponding to work. In step S1507, the digital multifunction peripheral 102 accepts selection of the medium setting template by the user. In step S1508, the digital multifunction peripheral 102 determines whether the user pressed an "OK" button 1801. If the digital multifunction peripheral 102 determines that the user did not press the "OK" button 1801, the process advances to step S1515 to determine whether he pressed a "cancel" button 1802. If the user did not press the "cancel" button 1802, the process returns to step S1508. If the user pressed the "cancel" button 1802, the process returns to step S1505.

Figure 19:
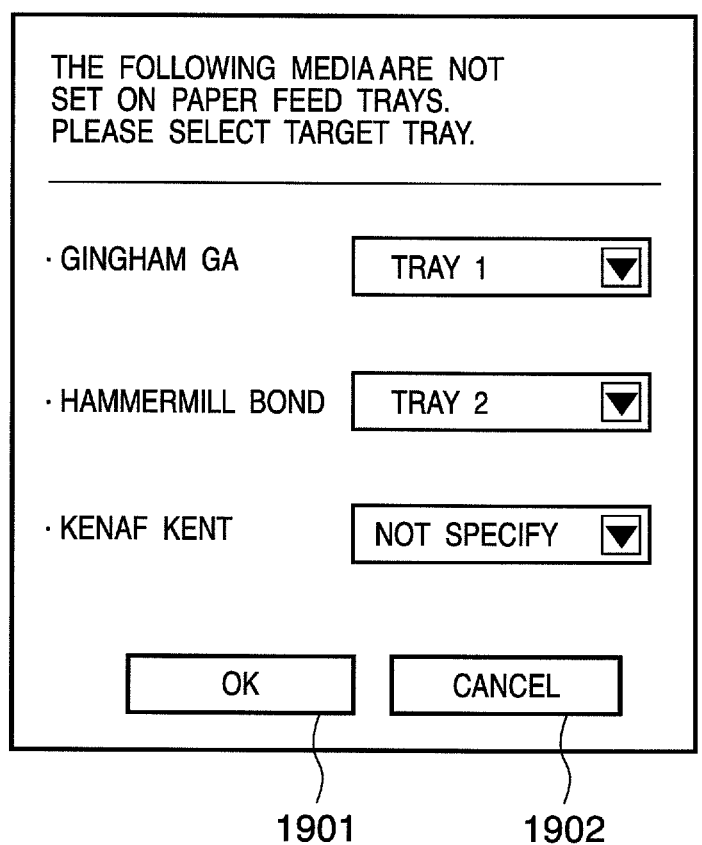
FIG. 19 is a view showing an example of a paper feed tray selection window.

If the digital multifunction peripheral 102 determines in step S1508 that the user pressed the "OK" button 1801, the process advances to step S1509 to display a paper feed tray selection window shown in FIG. 19. In the paper feed tray selection window, the user selects which of paper feed trays is used to set printing media. In step S1510, the digital multifunction peripheral 102 determines whether the user pressed an "OK" button 1901 in the paper feed tray selection window (FIG. 19). If the user did not press the "OK" button 1901, the process advances to step S1516 to determine whether he pressed a "cancel" button 1902. If the user did not press the "cancel" button 1902, the process returns to step S1510. If the digital multifunction peripheral 102 determines that the user pressed the "cancel" button 1902, the process returns to step S1505.

Figure 20:
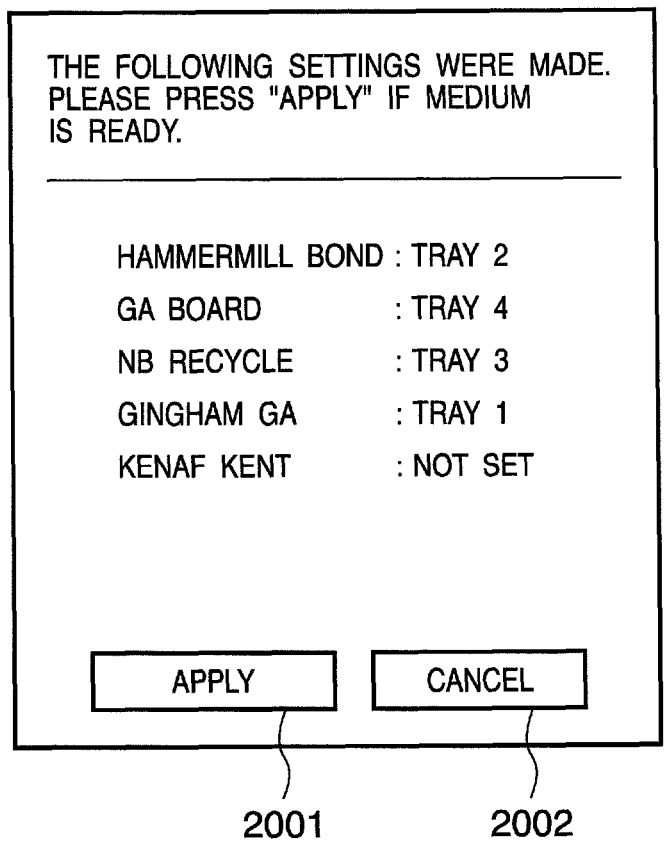
FIG. 20 is a view showing an example of a paper feed tray setting window.

If the digital multifunction peripheral 102 determines in step S1510 that the user pressed the "OK" button 1901, the process advances to step S1511 to display a paper feed tray setting window shown in FIG. 20. The digital multifunction peripheral 102 detects that printing media are set on respective paper feed trays as displayed in the paper feed tray setting window shown in FIG. 20. In other words, the operator must set predetermined printing media in respective paper feed trays in accordance with the paper feed tray setting window shown in FIG. 20.

In step S1512, the digital multifunction peripheral 102 determines whether the user pressed an "apply" button 2001 in the paper feed tray setting window (FIG. 20). If the digital multifunction peripheral 102 determines that the user did not press the "apply" button 2001, the process advances to step S1517 to determine whether he pressed a "cancel" button 2002. If the digital multifunction peripheral 102 determines that the user pressed the "cancel" button 2002, the process returns to step S1505. If the user did not press the "cancel" button 2002, the process returns to step S1512.

If the digital multifunction peripheral 102 determines in step S1512 that the user pressed the "apply" button 2001, the process advances to step S1513. In step S1513, the digital multifunction peripheral 102 causes a scanner unit 301 to scan a document in response to press of the start key 506, acquiring image data. In step S1514, the digital multifunction peripheral 102 prints out the acquired image data under copying conditions displayed on the copy setting window shown in FIG. 16.

As is apparent from the above description, the digital multifunction peripheral according to the second embodiment has the medium setting template. The digital multifunction peripheral can selectively display the template name of the medium setting template when inputting copying conditions in copying.

By only selecting the template name, the user can set, in the digital multifunction peripheral, information representing the attributes of a printing medium set on each paper feed tray. That is, the user can avoid conventional work to select predetermined information from pieces of information representing the attributes of hundreds of printing media and make settings for each paper feed tray. The second embodiment can, therefore, reduce the burden of setting work.

When a plurality of printing media associated with each template name do not correspond to paper feed trays, a paper feed tray can be selectively set.

Concrete cases of control by a controller unit 302 of the digital multifunction peripheral 102 will be further explained on the basis of the above-described flowchart of FIG. 15.

Control Example 3

A case will be described where the digital multifunction peripheral 102 causes a printer unit 303 to print data (document data) scanned by the scanner unit 301 of the digital multifunction peripheral 102, in accordance with a printing instruction from an operation unit 304. This job will be called job C.

The controller unit 302 of the digital multifunction peripheral 102 controls to accept printing conditions and a printing start instruction via the operation unit 304 of the digital multifunction peripheral 102 for the printing process of job C. The printing conditions are various conditions which are input from the operation unit 304 and associated with a printing process and post-process. The printing conditions include, e.g., the presence/absence of stapling, the number of copies, and selection of a printing medium.

The controller unit 302 of the digital multifunction peripheral 102 causes the operation unit 304 to display the window as shown in FIG. 16 as an operation window. When the user presses the application mode key 1618, the controller unit 302 of the digital multifunction peripheral 102 causes the operation unit 304 of the digital multifunction peripheral 102 to display the application mode window shown in FIG. 17. When the user of the digital multifunction peripheral 102 selects the "medium setting template" button 1701 via the operation unit 304, the controller unit 302 executes the following process. The controller unit 302 causes the operation unit 304 of the digital multifunction peripheral 102 to display the medium setting template selection window shown in FIG. 18. At this time, the controller unit 302 reads out data as shown in FIG. 27 saved in a memory 305 as data of the medium setting template 201, and causes the operation unit 304 of the digital multifunction peripheral 102 to display the readout data.

When a long time is taken to search the memory 305 for data of the medium setting template 201, the controller unit 302 may present the following display. That is, the controller unit 302 of the digital multifunction peripheral 102 may cause the operation unit 304 of the digital multifunction peripheral 102 to display information notifying the user of the digital multifunction peripheral 102 that the controller unit 302 is searching for data of the medium setting template 201.

After search, the controller unit 302 of the digital multifunction peripheral 102 displays a list of data of the medium setting template 201 on the basis of data of the medium setting template 201 read out from the memory 305. At this time, the controller unit 302 of the digital multifunction peripheral 102 causes the operation unit 304 to present the display so that the user can identify the correspondence between an identifier and options for printing media available in the digital multifunction peripheral 102. More specifically, the operation unit 304 displays set medium names "Hammermill bond", "GA board", "NB recycle", "gingham GA", and "kenaf Kent".

According to the second embodiment, the controller unit 302 controls to display, on the operation unit 304 of the digital multifunction peripheral 102, a list of identifiers associated with a plurality of printing media available in the digital multifunction peripheral 102 in printing, on the basis of data of the medium setting template 201 read out from the memory 305 of the digital multifunction peripheral 102. Also, the controller unit 302 controls to allow the user of the digital multifunction peripheral 102 to select a desired one of identifiers from the list. The controller unit 302 controls to display, on the operation unit 304 of the digital multifunction peripheral 102, a list of options (set media) associated with one identifier in response to selection of one identifier from the display list by the user of the digital multifunction peripheral 102. The controller unit 302 of the digital multifunction peripheral 102 controls to allow the user of the digital multifunction peripheral 102 to select one of the options via the user interface unit.

In this example, assume that the user of the digital multifunction peripheral 102 selects "GA board" from the set medium name list and presses the "OK" button 1801 via the operation unit 304. In this case, the controller unit 302 selects a printing medium represented by the designated option, enabling a printing process using the printing medium.

At this time, the controller unit 302 implements a printing process flexibly coping with various printing media by searching for the attributes of each printing medium shown in FIG. 28 and properly using them. In the example of FIG. 28, the controller unit 302 reads out attribute data such as "thickness: 18", "color: light blue", and "fixing temperature: XX° C." which are attributes of "GA board" and also engine parameters directly related to the printer engine. The controller unit 302 causes the printer unit 303 to execute printing of job C by a printing process based on the attribute data (e.g., "thickness: 18", "color: light blue", and "fixing temperature: XX° C."). By controlling the printing process of the printer unit 303, the controller unit 302 can execute printing complying with parameters unique to the printing medium.

Control Example 4

A case will be described where the digital multifunction peripheral 102 causes the printer unit 303 to print data (document data) read from a storage unit such as the memory 305 or an HD 440 of the digital multifunction peripheral 102, in accordance with printing condition settings and a printing instruction from the operation unit 304. This job will be called job D. The printing conditions are various conditions which are input from the operation unit 304 and associated with a printing process and post-process. The printing conditions include, e.g., the presence/absence of stapling, the number of copies, and selection of a printing medium.

Figure 30:
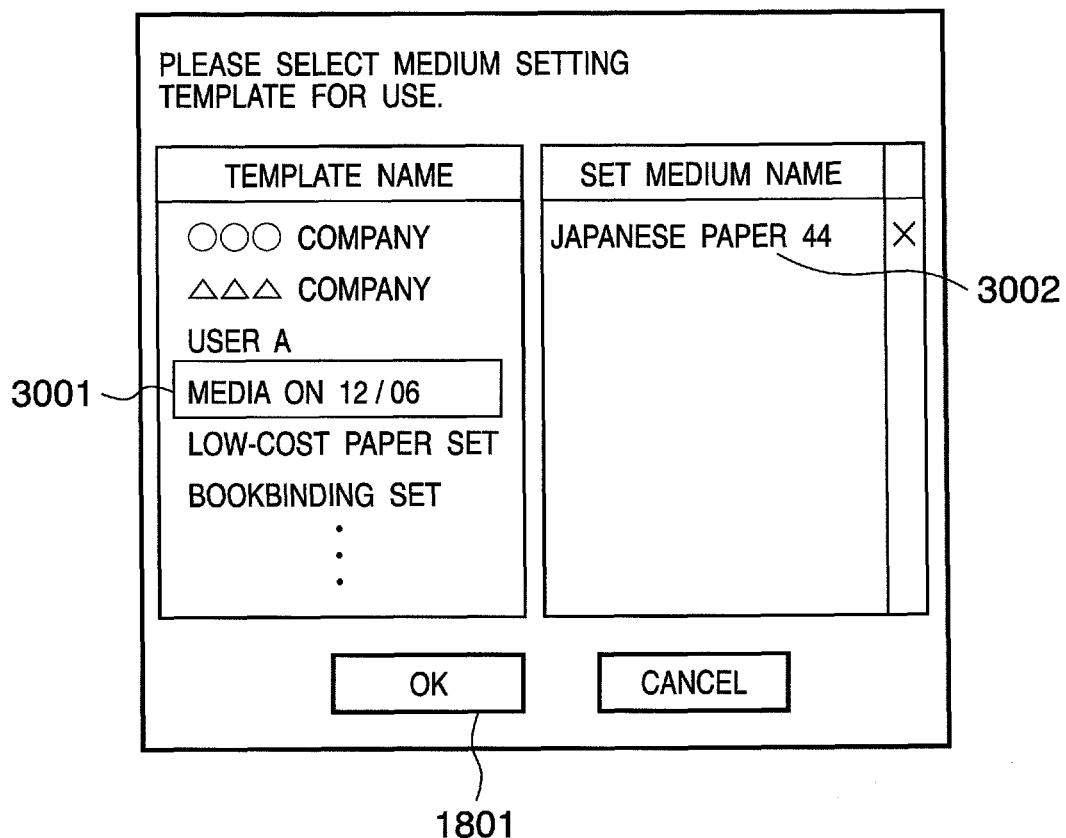
FIG. 30 is a view showing an example of display of the medium setting template.

Assume that the user selects, as another identifier, "media on 12/06" via the operation unit 304 of the digital multifunction peripheral 102 that displays the medium setting template selection window shown in FIG. 18. The controller unit 302 searches the medium setting template 201 stored and held in the memory 305 for a set medium name associated with a "media on 12/06" option 3001 in FIG. 30, and reads out the set medium name. The controller unit 302 causes the operation unit 304 to display "Japanese paper 44" as an option associated with the identifier "media on 12/06", as shown in FIG. 30.

The controller unit 302 controls to allow the user to select an option via the operation unit 304 from set medium options associated with the displayed identifier. For example, when the user of the digital multifunction peripheral 102 selects "Japanese paper 44" and presses the "OK" button 1801 via the operation unit 304, the controller unit 302 selects a printing medium represented by the designated option, and executes the printing process of job D.

At this time, the controller unit 302 implements a printing process flexibly coping with various printing media by searching for the attributes of each printing medium shown in FIG. 28 and properly using them. In the example of FIG. 28, the controller unit 302 reads out attribute data such as "thickness: 38", "color: light brown", and "fixing temperature: XX° C." which are attributes of "Japanese paper 44" and also engine parameters directly related to the printer engine. The controller unit 302 causes the printer unit 303 to execute printing of job D by a printing process based on the attribute data (e.g., "thickness: 38", "color: light brown", and "fixing temperature: XX° C."). By controlling the printing process of the printer unit 303, the controller unit 302 can execute printing of job D complying with parameters unique to the printing medium.

By controlling the printing medium selection process, the same effects as those described in the above-described example of selection control from the client PC 101 can also be obtained by an operation from the digital multifunction peripheral 102. The digital multifunction peripheral 102 also allows selection using the medium setting template 201 which is possible from the client PC 101, thus further improving usability.

Based on the above description, the second embodiment presents a plurality of printing medium options associated with one identifier among a plurality of identifiers associated with printing media available in the printing apparatus. For example, the controller of the printing apparatus or the CPU of the information processing apparatus controls the presentation. At this time, the user interface unit presents a plurality of printing medium options associated with one identifier so as to discriminate them from those associated with other identifiers. The printing apparatus selects a printing medium corresponding to an option selected by a user from a plurality of options presented by the user interface unit.

An example of presenting options so that the user can discriminate them will be explained.

When the area for candidates is limited or not ensured, or candidates cannot be presented at once, they are preferably presented by changing their order. For example, the user interface is a display means capable of displaying only three lines. In this case, the user interface displays a plurality of identifiers to prompt the user to select an identifier with hard keys or the like. When there are six printing medium selection candidates associated with the selected identifier and one line displays one candidate, the user interface cannot simultaneously display all the candidates. Thus, the user interface first displays three selection candidates, and then displays the remaining three selection candidates in response to an instruction with the hard keys or the like. If the user interface is instructed with the hard keys or the like to advance to the next display, it may display printing medium selection candidates not associated with the selected identifier, together with their identifier.

A case where the user interface can use a wide display area will be examined. In this case, the user interface displays a plurality of selection candidates at once in part of the available display area to allow the user to discriminate the selection candidates. As a concrete method of discriminating selection candidates by the area, the user interface preferably displays many selection candidates using a pull-down menu, scroll bar, or the like. The user interface may display only printing medium selection candidates associated with the identifier "OOO company" in the set medium field, as shown in FIG. 12. In this case, the user interface does not display printing medium selection candidates associated with another identifier, e.g., "ΔΔΔ company" in FIG. 12. The user interface displays only printing medium selection candidates associated with a predetermined area. Thus, the user can discriminate selection candidates by the area.

Association between an identifier and a printing medium may be stored in advance. It is also possible to input an identifier via the user interface unit, and input a plurality of printing medium selection candidates associated with the input identifier. In this case, printing medium selection candidates can be displayed at once in accordance with a user's business customer serving as an identifier. Also, the user can create a desired identifier. More specifically, the CPU 702 or controller unit 302 accepts input of an arbitrary identifier from the user via the user interface unit. In response to this, the CPU 702 or controller unit 302 records the identifier in the medium setting template 201 held in the memory 305 of the digital multifunction peripheral 102. The user can also input options corresponding to the input identifier via the user interface unit, and the CPU 702 or controller unit 302 similarly records them in the medium setting template 201.

It is also possible to associate an identifier not only with printing media but also with another identifier. Assume that a given customer belongs to many fields and frequently uses many types of printing media. In this case, the user classifies the customer depending on the fields and creates identifiers, which further facilitates selection. Alternatively, the identifier of a paper manufacturer may be associated with that of a paper size. More specifically, the user interface unit presents first identifiers associated with one identifier so that the user can discriminate them from printing medium selection candidates and/or identifiers associated with second identifiers including one second identifier. The user interface unit presents a plurality of printing medium selection candidates associated with an identifier specified from the first identifiers so that the user can discriminate them from selection candidates and/or identifiers associated with another identifier. The printing apparatus can select a printing medium associated with a selection candidate specified from the plurality of selection candidates. This arrangement can achieve the above-described example.

When a printing medium is selected, the printing apparatus preferably prints on the selected printing medium using print settings associated with it. This enables printing considering printing medium properties which are different between printing media. It is also possible to record and manage the use of printing media.

The user interface unit may be that of an information processing apparatus communicably connected to a printing apparatus which prints on a printing medium, or that of the printing apparatus. The user interface unit may be another external display means or audio means.

The user interface unit of the printing apparatus preferably gives a presentation to prompt a user to stack selected printing media on the stacking means. This presentation notifies the user of a stacking means for use and printing media to be stacked, reducing user's errors.

One identifier need not always correspond to N printing medium selection candidates, and may correspond to one printing medium selection candidate. However, candidate selection becomes simpler by enabling registering at least N-to-1 correspondence.

Conceivable examples of the user interface unit are a display means (touch panel or another type of display) and an audio means.

Based on the above description, a process to allow a user to grasp his use status will be explained with reference to the accompanying drawings.

Figure 21:
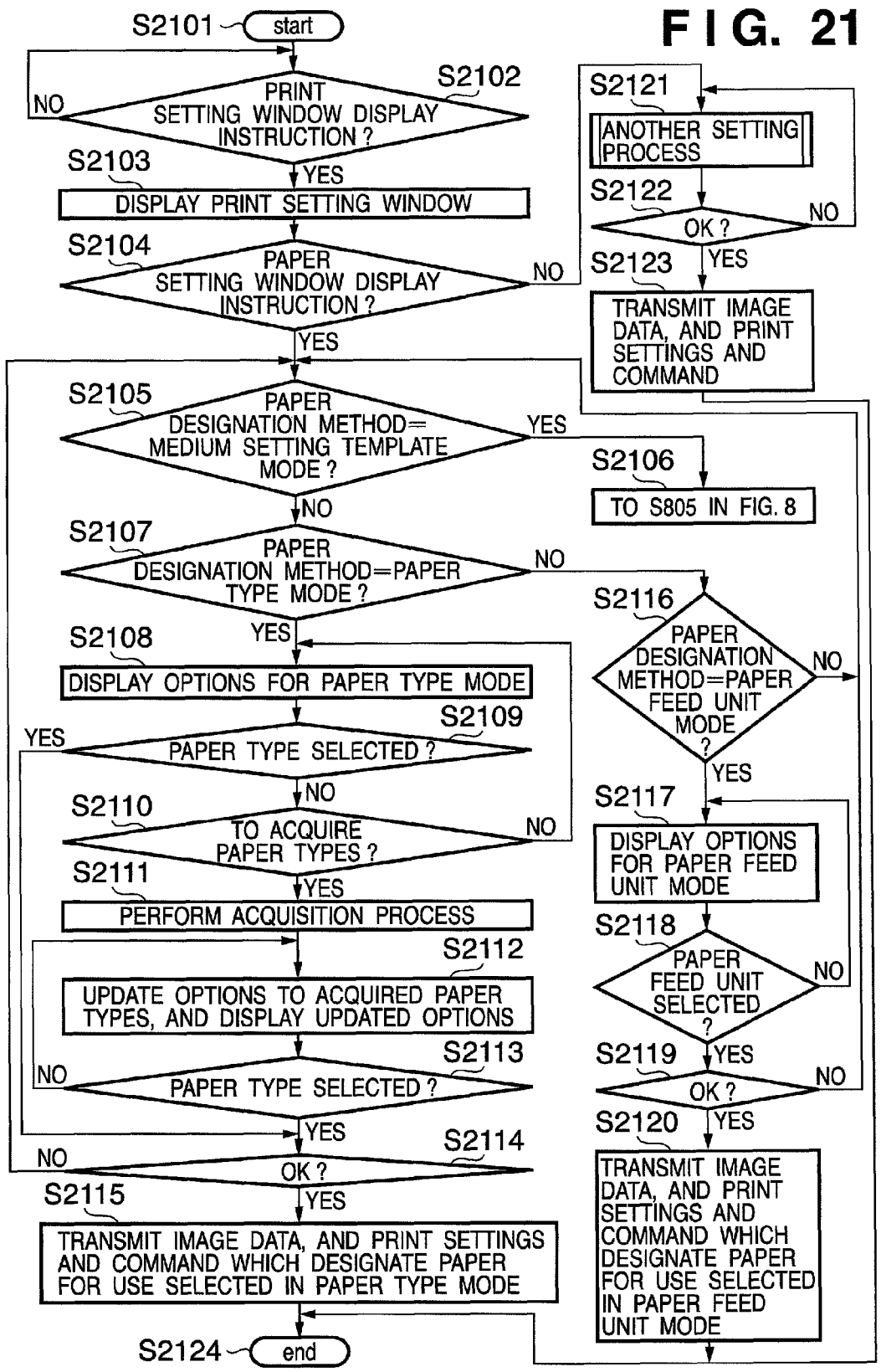
FIG. 21 is a flowchart showing process procedures in the client PC 101 when the digital multifunction peripheral 102 prints on the basis of image data transmitted from the client PC 101.

Although the paper selection operation has been described with reference to FIG. 8, a process including another paper selection operation will be described with reference to FIG. 21.

Figure 22:
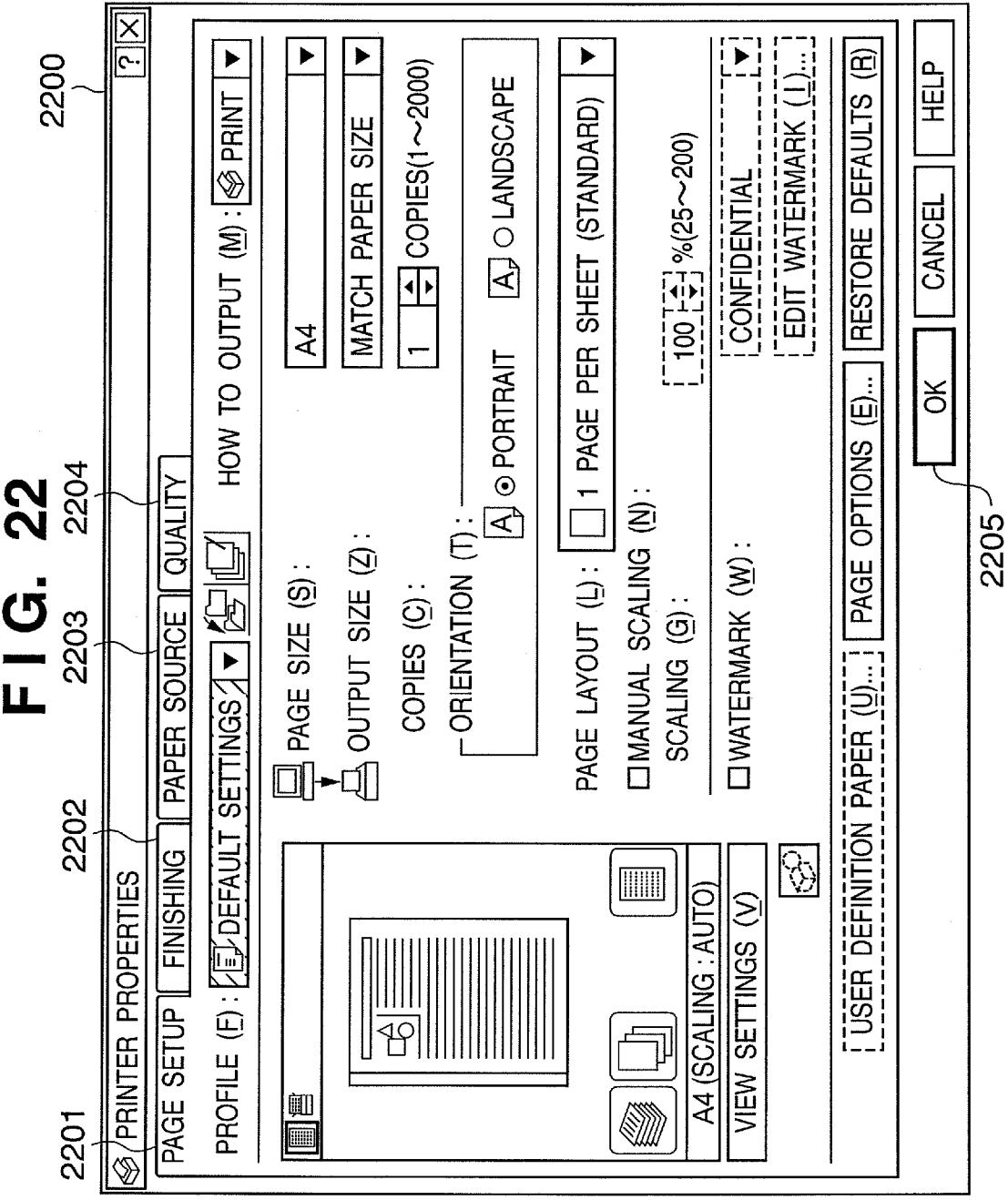
FIG. 22 is a view showing an example of a print setting window displayed on the client PC 101.

The process starts in S2101. In S2102, the process waits until the client PC 101 is instructed to display a print setting window. If the client PC 101 determines in S2102 that it is instructed to display a print setting window, it displays the print setting window in S2103. This window is, e.g., a print setting window 2200 in FIG. 22. The process advances to S2104 to determine whether the client PC 101 is instructed to display a paper setting window. This instruction is input via a paper source tab 2203 in FIG. 22. As is apparent from FIG. 22, the print setting window 2200 allows various settings, and the user can instructs the client PC 101 to present display for settings on a page setup tab 2201, finishing tab 2202, and quality tab 2204. For example, the finishing tab 2202 is associated with a display window for making settings related to finishing. The user can set finishing such as stapling or sorting via the display window for making finishing settings. The client PC 101 transmits print settings (printing conditions) made via these setting windows, together with paper settings in steps to be described below.

Figure 23:
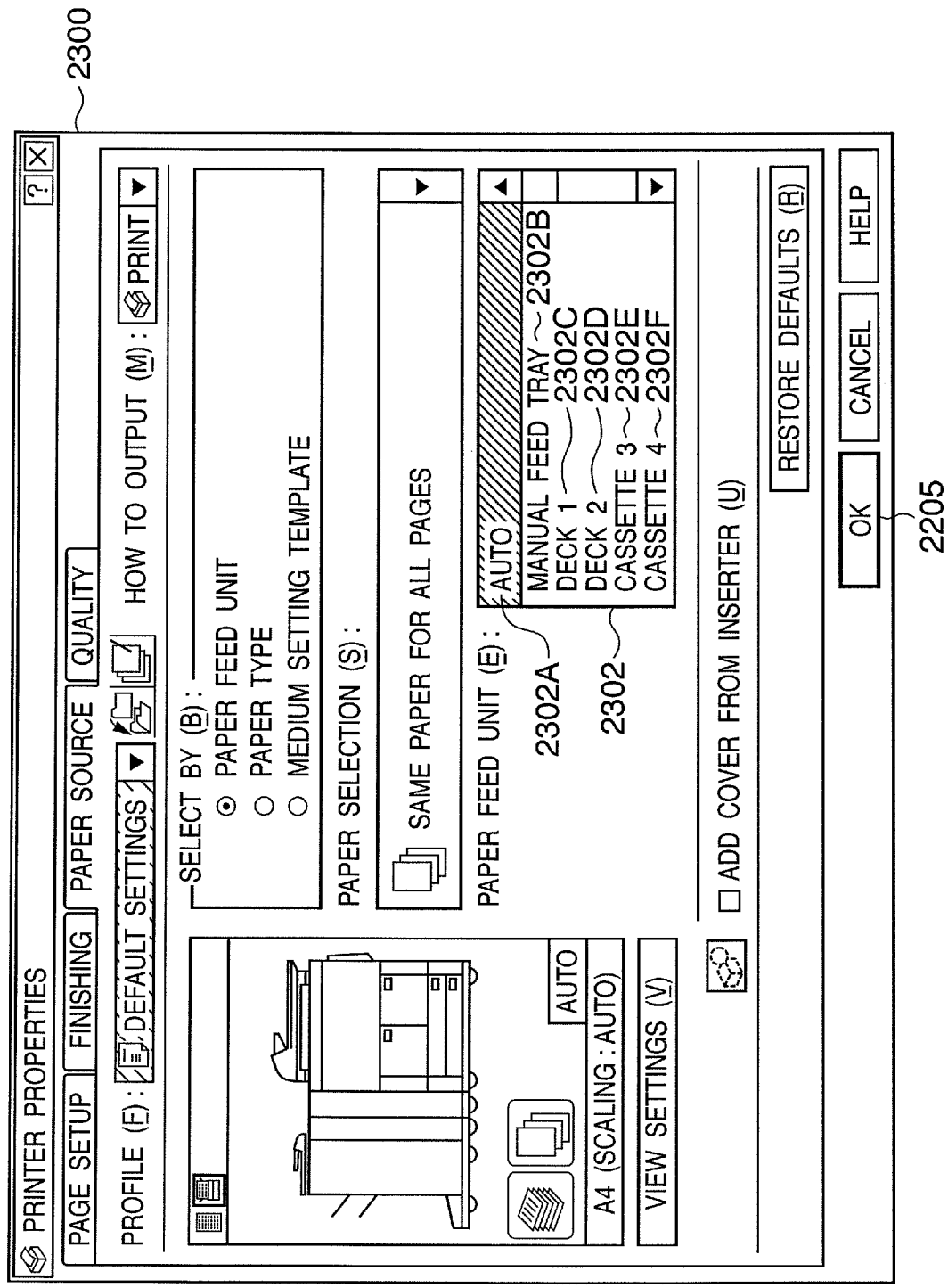
FIG. 23 is a view showing an example of a print setting window displayed on the client PC 101.

If the client PC 101 determines in S2104 that it is instructed to display the paper setting window, it displays a paper setting window 2300 in FIG. 23. The user can select a paper designation method via the display.

In S2105, the client PC 101 determines whether the designation method is a mode using a medium setting template. If the medium setting template is to be used, the process advances to S2106. The process for the medium setting template is that after S805 in FIG. 8, and a description thereof will be omitted.

Figure 24:
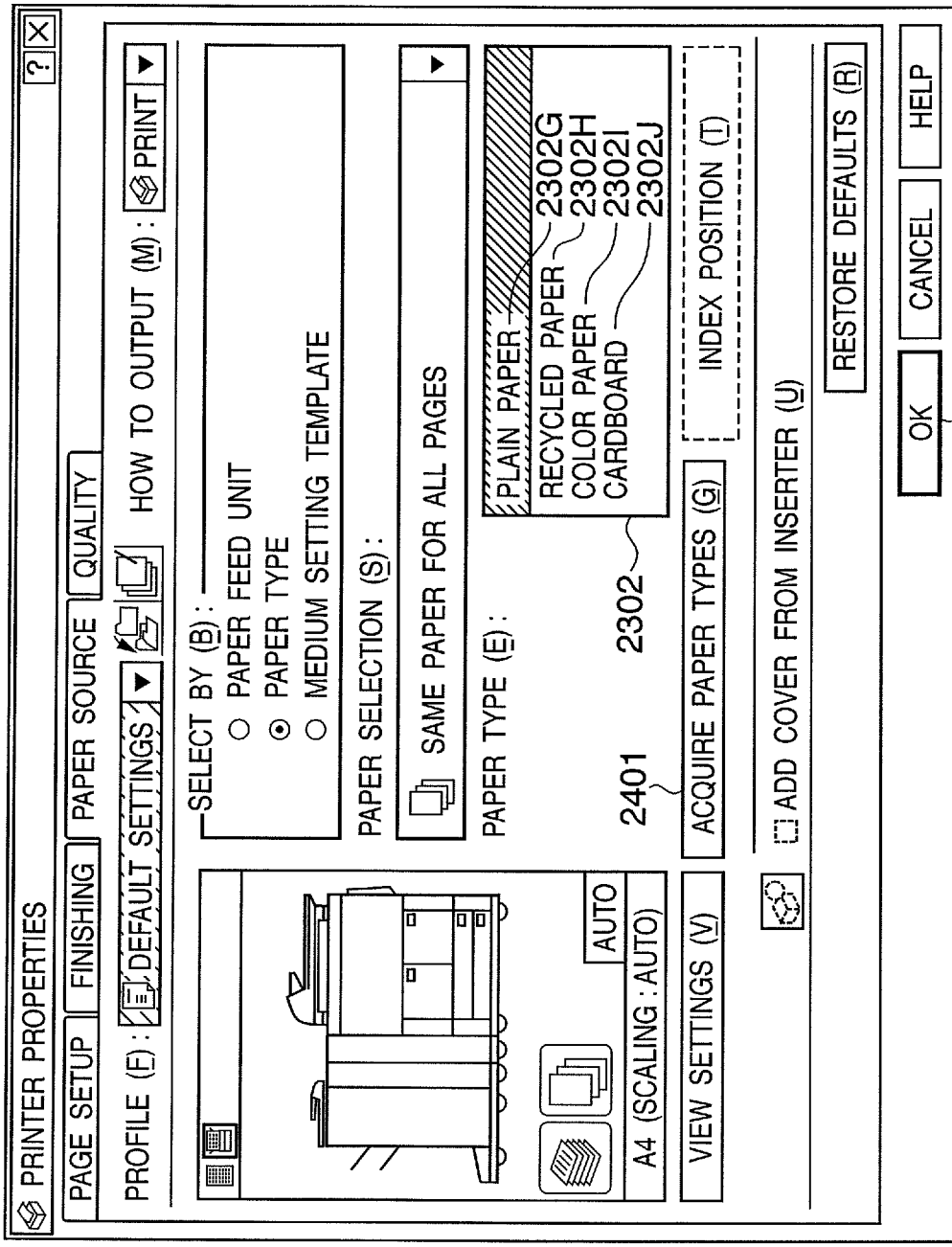
FIG. 24 is a view showing an example of a print setting window displayed on the client PC 101.
Figure 25:
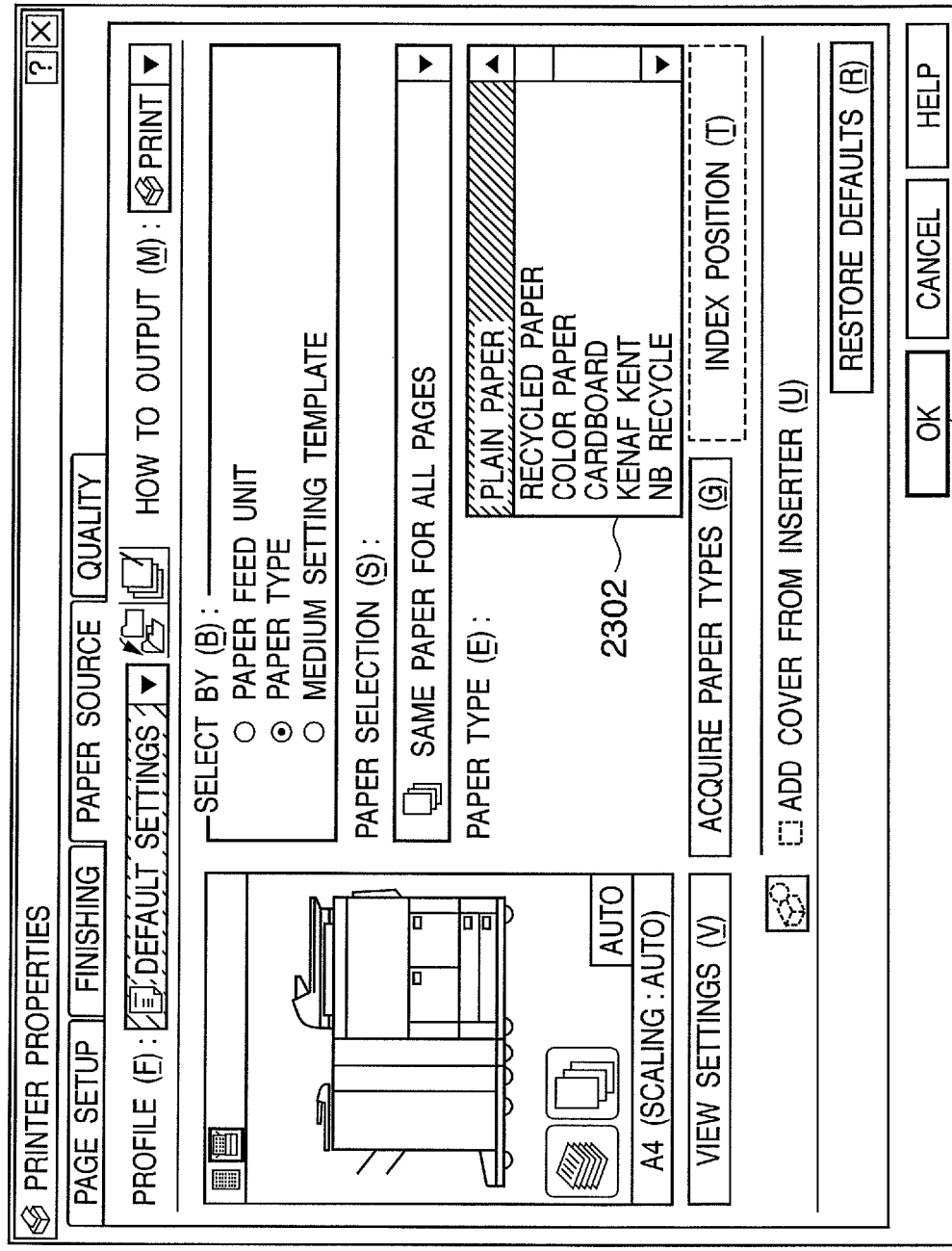
FIG. 25 is a view showing an example of a print setting window displayed on the client PC 101.

If NO in S2105, the process advances to S2107. If the client PC 101 determines that the paper designation method is to designate paper from paper types, the process advances to S2108. At this time, paper types held in advance are displayed as selection candidates, as shown in FIG. 24. In this example, an area 2302 in FIG. 24 displays paper types 2302G to 2302J as selection candidates. If the user selects a selection candidate, the process advances to S2114 via determination in S2109. When the client PC 101 is instructed to acquire paper types via a paper type acquisition instruction 2401 in FIG. 24, it determines in S2110 whether to acquire paper types, and executes a paper type acquisition process in S2111. In the paper type acquisition process in S2111, the client PC 101 requests the printing apparatus or the like to transmit paper type selection candidates via the network, and stores the selection candidates. In S2112, the client PC 101 updates selection candidates to the acquired paper types and displays the updated selection candidates. Referring to FIGS. 24 and 25, the number of paper type selection candidates in the area 2302 increases in FIG. 25 from FIG. 24. These selection candidates are selectable. If the user presses an OK button 2205, the client PC 101 transmits, after determination in S2114, image data and a print setting command containing an instruction to use printing paper selected from selection candidates in the paper type mode. Then, the process ends.

If NO in S2107, the process advances to determination in S2116. In S2116, the client PC 101 determines whether the paper designation method is a paper feed unit mode. In the paper feed unit mode, the client PC 101 displays selection candidates in the paper feed unit mode in S2117. In the example of FIG. 23, the area 2302 in FIG. 23 displays paper feed unit selection candidates. FIG. 23 shows selection candidates 2302A to 2302F in the paper feed unit mode. If the user selects a selection candidate, the process advances to S2119 to transmit image data and a print setting command containing an instruction to use paper by the printing apparatus. The process ends in S2124 described above.

In S2121, the client PC 101 performs a process other than paper setting. If the user presses the OK button 2205 in S2121, the client PC 101 transmits a print setting command and image data, and the process ends. As described above, the client PC 101 transmits the print setting command containing a plurality of setting commands. Together with an image, the client PC 101 transmits an instruction to use paper selected from selection candidates, an instruction to perform stapling, an instruction to designate the number of copies, and the like.

Figure 26:
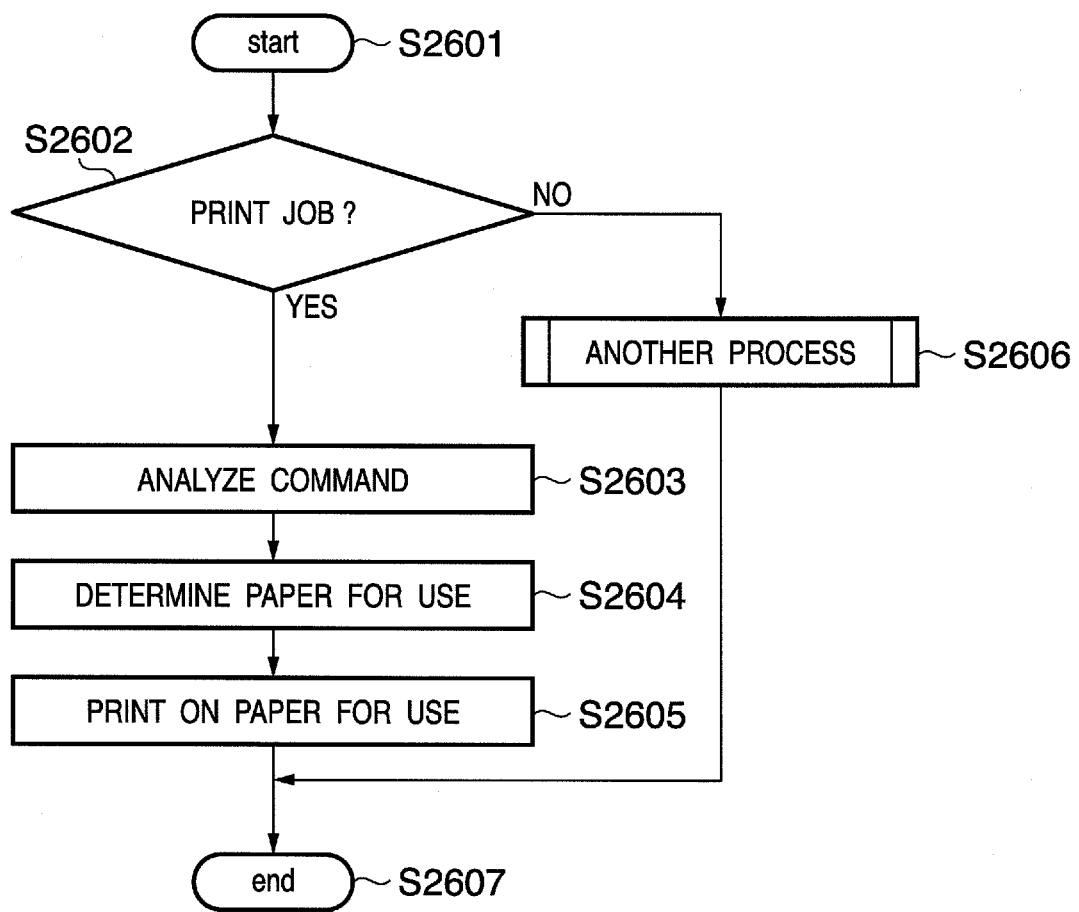
FIG. 26 is a flowchart showing printout process procedures in the digital multifunction peripheral 102 upon reception of image data from the client PC 101.

FIG. 26 is a flowchart showing a process by the printing apparatus. An example of the printing apparatus is a multifunction peripheral having the copy and FAX functions. Upon reception of a job subjected to printing (print setting command and image data), the printing apparatus analyzes the command in S2603. The printing apparatus determines paper for use from the command in S2604, prints in S2605, and ends the process. S2606 is a process other than a print job.

Other Embodiment

The present invention may be applied to a system including a plurality of devices (e.g., a host computer, interface device, reader, and printer) or an apparatus (e.g., a copying machine or facsimile apparatus) formed by a single device.

The object of the present invention is also achieved by supplying a storage medium which records software program codes for implementing the functions of the above-described embodiments to a system or apparatus. In this case, these functions are achieved by reading out and executing the program codes stored in the storage medium by the computer (or the CPU or MPU) of the system or apparatus. In this case, the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The present invention is not limited to a case where the functions of the above-described embodiments are implemented when the computer executes the readout program codes. Also, the present invention includes a case where an OS (Operating System) or the like running on the computer performs some or all of actual processes on the basis of the instructions of the program codes and thereby implements the functions of the above-described embodiments.

Furthermore, the present invention includes a case where the functions of the above-described embodiments are implemented after the program codes read out from the storage medium are written in the memory of a function expansion board inserted into the computer or the memory of a function expansion unit connected to the computer. That is, the present invention also includes a case where after the program codes are written in the memory, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-318740 filed on Nov. 1, 2005, which is hereby incorporated by reference herein in its entirety.

What is claimed is:

1. An information processing apparatus which is able to communicate with a printing apparatus, the printing apparatus comprising sheet holding units, the printing apparatus executing printing according to types of sheets registered for respective sheet holding units, comprising:
    a receiving unit configured to receive template data in which a plurality of types of sheets are associated with one template name, the one template name being registered by a user;
    a display unit configured to display the template data; and
    a control unit configured to control the printing apparatus to register a first type identified by the one template name selected based on the displayed template data as a type of sheets held in a first sheet holding unit included in the sheet holding units, and to register a second type identified by the selected one template name as a type of sheets held in a second sheet holding unit included in the sheet holding units, the second type being different from the first type.

2. The information processing apparatus according to claim 1, further comprising a notifying unit that notifies a user of a type which is not registered as types of sheets held in the sheet holding units among the types of sheets identified by the selected one template name.

3. The information processing apparatus according to claim 2, wherein the notifying unit notifies a user of the type of the sheet which is not registered as types of sheets held in the sheet holding units and a type of a sheet which is already registered as any type of sheet held in the sheet holding units among the types of sheets identified by the selected one template name.

4. The information processing apparatus according to claim 2, wherein the notifying unit prompts the user to designate, from among the sheet holding units, a sheet holding unit for which a type of a sheet which is not registered as types of sheets held in the sheet holding units is registered.

5. The information processing apparatus according to claim 1, wherein the printing apparatus prints according to a thickness or a fixing temperature specified by the type of the sheet.

6. A printing apparatus which comprises sheet holding units and executes printing according to types of sheets registered for respective sheet holding units, comprising:
    a storage unit configured to store template data in which a plurality of types of sheets are associated with one template name, the one template name being registered by a user;
    a display unit configured to display the template data; and
    a setting unit configured to register a first type identified by the one identifier template name selected based on the template data displayed by the display unit as a type of sheets held in a first sheet holding unit included in the sheet holding units, and register a second type of sheet identified by the one template name selected based on the template data displayed by the display unit as a type of sheets held in a second sheet holding unit included in the sheet holding units, the second type being different from the first type.

7. A control method for controlling an information processing apparatus which is able to communicate with a printing apparatus, the printing apparatus comprising sheet holding units, the printing apparatus executing printing according to types of sheets registered for respective sheet holding units, comprising:

receiving template data in which a plurality of types of sheets are associated with one template name, the one template name being registered by a user;

displaying, on a display unit, the template data; and controlling the printing apparatus to register a first type identified by the selected one template name selected based on the displayed template data as a type of sheets held in a first sheet holding unit included in the sheet holding units, a second type identified by the selected one template name as a type of sheets held in a second sheet holding unit included in the sheet holding units, the second type being different from the first type.

8. A control method for controlling a printing apparatus which comprises sheet holding units and executes printing according to types of sheets registered for respective sheet holding units, comprising:

storing, in a storage unit, template data in which a plurality of types of sheets are associated with one template name, the one template name being registered by a user;

displaying, on a display unit, the template data; and registering a first type identified by the one template name selected based on the displayed template data as a type of sheets held in a first sheet holding unit included in the sheet holding units, and registering a second type of sheet identified by the one template name selected based on the displayed template data as a type of sheets held in a second sheet holding unit included in the sheet holding units, the second type being different from the first type.

9. A non-transitory computer readable storage medium for storing a computer program for controlling an information processing apparatus which is able to communicate with a printing apparatus, the printing apparatus comprising sheet holding units, the printing apparatus executing printing according to types of sheets registered for respective sheet holding units, comprising:

a code to receive template data in which a plurality of types of sheets are associated with one template name, the one template name being registered by a user;

a code to display, on a display unit, the template data; and a code to control the printing apparatus to register a first type identified by the selected one template name selected based on the displayed template data as a type of sheets held in a first sheet holding unit included in the sheet holding units, and to register a second type identified by the selected one template name as a type of sheets held in a second sheet holding unit included in the sheet holding units, the second type being different from the first type.

10. A non-transitory computer readable storage medium for storing a computer program for controlling a printing apparatus which comprises sheet holding units and executes printing according to types of sheets registered for respective sheet holding units, comprising:

a code to store, in a storage unit, template data in which a plurality types of sheets are associated with one template name, the one template name being registered by a user;

a code to display, on a display unit, the template data; and a code to register a first type identified by the one template name selected based on the displayed template data as a type of sheets held in a first sheet holding unit included in the sheet holding unit, and register a second type of sheet identified by the one template name selected based on the displayed template data as a type of sheets held in a second sheet holding unit included in the sheet holding units, the second type being different from the first type.

\* \* \* \* \*